(12) United States Patent
Stoyen et al.

(10) Patent No.: US 7,926,029 B1
(45) Date of Patent: Apr. 12, 2011

(54) SYSTEM AND METHOD OF PROGRESSIVE DOMAIN SPECIALIZATION PRODUCT SOLUTIONS

(75) Inventors: Alexander D. Stoyen, Herndon, VA (US); Plamen D. Petrov, Omaha, NE (US); Qiuming Ming, Omaha, NE (US); Eric Lindahl, Omaha, NE (US)

(73) Assignee: 21st Century Systems, Inc., Herndon, VA (US)

( * ) Notice: Subject to any disclaimer, the term of this patent is extended or adjusted under 35 U.S.C. 154(b) by 1784 days.

(21) Appl. No.: 11/035,261

(22) Filed: Jan. 13, 2005

(51) Int. Cl.
*G06F 9/44* (2006.01)

(52) U.S. Cl. ........ 717/117; 717/101; 717/102; 717/108; 717/116; 706/60; 706/61; 706/11; 706/46; 706/47

(58) Field of Classification Search .................. 717/117, 717/108, 116; 706/60, 61, 10, 29, 30, 46, 706/47; 709/202, 218, 223, 201
See application file for complete search history.

(56) References Cited

U.S. PATENT DOCUMENTS

| | | | | |
|---|---|---|---|---|
| 5,712,960 A * | 1/1998 | Chiopris et al. | ............ | 706/61 |
| 5,778,157 A * | 7/1998 | Oatman et al. | ............ | 706/46 |
| 5,987,443 A * | 11/1999 | Nichols et al. | ............ | 706/11 |
| 6,018,731 A * | 1/2000 | Bertrand et al. | ............ | 706/47 |
| 6,122,664 A * | 9/2000 | Boukobza et al. | ............ | 709/224 |
| 6,163,794 A * | 12/2000 | Lange et al. | ............ | 709/202 |
| 6,289,382 B1 * | 9/2001 | Bowman-Amuah | ............ | 709/226 |
| 6,332,163 B1 * | 12/2001 | Bowman-Amuah | ............ | 709/231 |
| 6,360,193 B1 * | 3/2002 | Stoyen | ............ | 703/17 |
| 6,449,643 B1 * | 9/2002 | Hyndman et al. | ............ | 709/223 |
| 6,529,948 B1 * | 3/2003 | Bowman-Amuah | ............ | 709/217 |
| 6,601,233 B1 * | 7/2003 | Underwood | ............ | 717/102 |
| 6,601,234 B1 * | 7/2003 | Bowman-Amuah | ............ | 717/108 |
| 6,721,713 B1 * | 4/2004 | Guheen et al. | ............ | 705/1.1 |
| 6,782,374 B2 * | 8/2004 | Nichols | ............ | 706/45 |
| 7,191,163 B2 * | 3/2007 | Herrera et al. | ............ | 706/47 |
| 7,225,426 B2 * | 5/2007 | Frank et al. | ............ | 717/108 |
| 7,280,991 B1 * | 10/2007 | Beams et al. | ............ | 706/46 |
| 7,346,889 B1 * | 3/2008 | Semenov et al. | ............ | 717/106 |
| 7,356,522 B2 * | 4/2008 | Herrera et al. | ............ | 706/47 |
| 2002/0073101 A1 * | 6/2002 | Stoyen | ............ | 707/104.1 |
| 2003/0172368 A1 * | 9/2003 | Alumbaugh et al. | ............ | 717/106 |
| 2004/0148586 A1 * | 7/2004 | Gilboa | ............ | 717/108 |
| 2004/0193559 A1 * | 9/2004 | Hoya | ............ | 706/27 |
| 2005/0050537 A1 * | 3/2005 | Thompson et al. | ............ | 717/165 |
| 2005/0091305 A1 * | 4/2005 | Lange et al. | ............ | 709/202 |
| 2005/0210008 A1 * | 9/2005 | Tran et al. | ............ | 707/3 |
| 2007/0006149 A1 * | 1/2007 | Resnick et al. | ............ | 717/116 |
| 2008/0010629 A1 * | 1/2008 | Berg et al. | ............ | 717/116 |

OTHER PUBLICATIONS

Title: An architecture of distributed frame hierarchy for knowledge sharing and reuse in computer networks, author: Soshnikov, source: IEEE, dated: Dec. 10, 2002.*

Title: UTSAF: a multi-agent-based framework for supporting military-based distributed interactive simulations in 3D virtual environments, author: Manojlovich, J et al, source: IEEE, dated: Dec. 7, 2003.*

* cited by examiner

*Primary Examiner* — Chameli C Das
(74) *Attorney, Agent, or Firm* — Arnold & Porter LLP

(57) ABSTRACT

The present invention relates to a software development infrastructure and/or methodology in, for example, multi-platform computing environments. More specifically, this invention relates to a software development system and an approach for providing, for example in at least one embodiment, a lattice-based organization of interdependent software products for multi-dimensional progressive application specialization. The inventive system and method optionally starts with a generic root product node and incorporates more domain specific extensions in multiple tiers of constructs, facilities, and complexities, to create specialized applications.

19 Claims, 12 Drawing Sheets

Illustrative functional diagram of a tiered structure of user interaction in the present invention.

| Template GenericAgent ||
|---|---|
| Constructor Summary ||
| GenericAgent( GenericOntology _ontology, GenericExemplarNet _net, TopicSet _topics ); <br> GenericAgent( GenericOntology _ontology, GenericExemplarNet _net, TopicSet _topics, <br> GenericAgentManager _Manager, String _uniqueID) <br> Constructs a new Generic Agent with Ontology and Semantics. Assigns it an initial set of event topics. An Agent Manager and a Unique ID can be provided optionally. ||
| Method Summary ||
| Public GenericAgentManager | getAgentManager() returns the Agent Manager of this agent. |
| Public TopicSet | getTopics() returns the set of topics this agent is interested in. |
| Public GenericOntology | getOntology() returns the current Ontology for this agent. |
| Public GenericExemplarNet | getSemanticNet() returns the Semantic Net for this agent. |
| Protected TopicSet | processEvent() force this agent to receive a direct event |
| Public String | getUniqueID() returns the unique id of this agent. |
| Public void | setAgentManager(GenericAgentManager _Manager) sets the AgentManager of this agent. |
| Public void | setTopics(TopicSet _topics) sets the Event Topics of interest. |
| Event Topic Detail ||
| Command | changePriority( float _priority) changes the preferred priority of this agent. |
| Semantic | addTopics( TopicSet _topics) adds to the set of topics this agent is interested in. |
| Data | requestName() requests the specific name/ID for this agent. |
| QoS Detail ||
| Periodic( 300 ms). ||
| Command | turnaround( 10 ) |
| Semantic | turnaround( 50 ) |
| Data | turnaround( 500 ) |
| Method Detail ||
| getUniqueID  public java.lang.String getUniqueID()  Returns: the unique id of this agent. ||
| setAgentManager protected void setAgentManager(GenericAgentManagerServiceProvider pManager) <br>     sets the AgentManager of this agent. <br>     Parameters: the AgentManager of this agent. ||

Figure 1. A sample agent template, i.e. the initial building block.

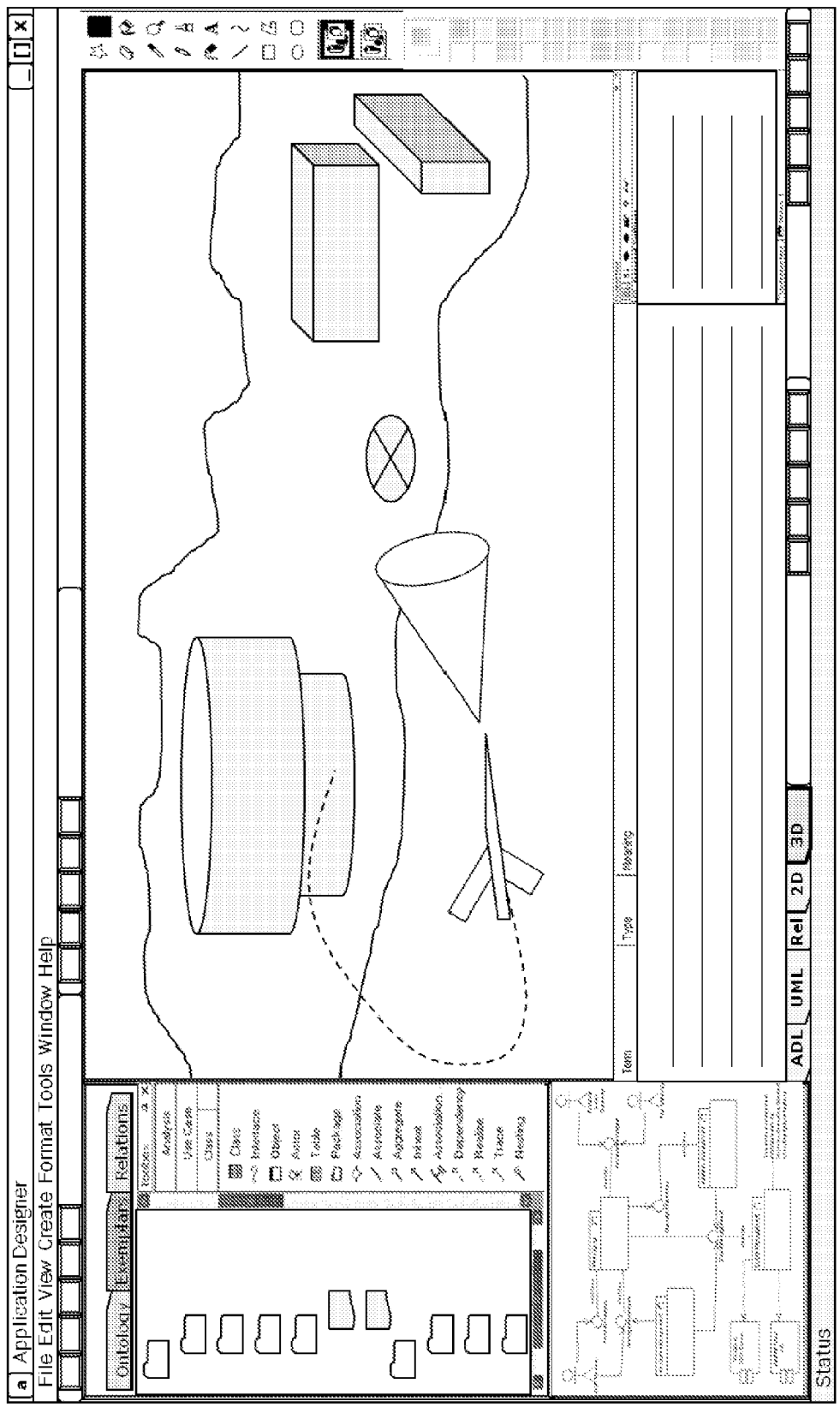
Figure 2. Example of the screen and objects that are presented to a system designer for a particular application domain, i.e. the application development environment.

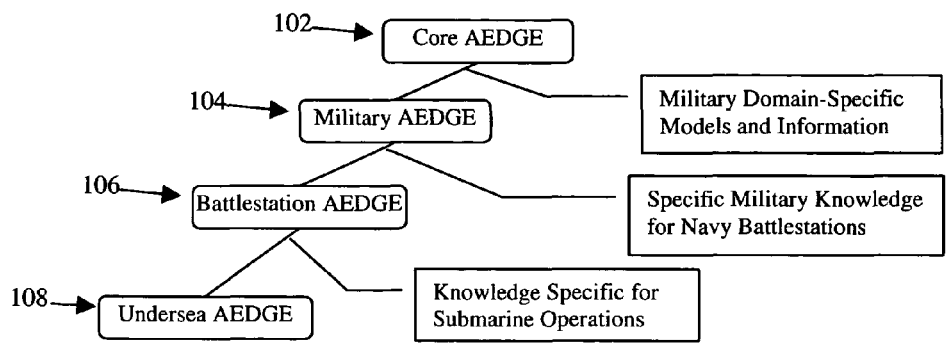
Figure 3. Illustrative diagram of domain specialization with some exemplary products.
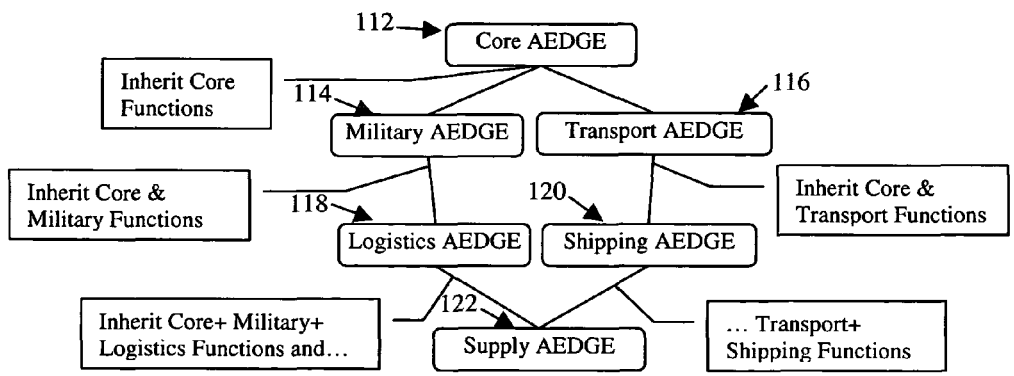
Figure 4. Illustrative diagram of the inheritance and propagation features in a lattice of the system architecture of the present invention.

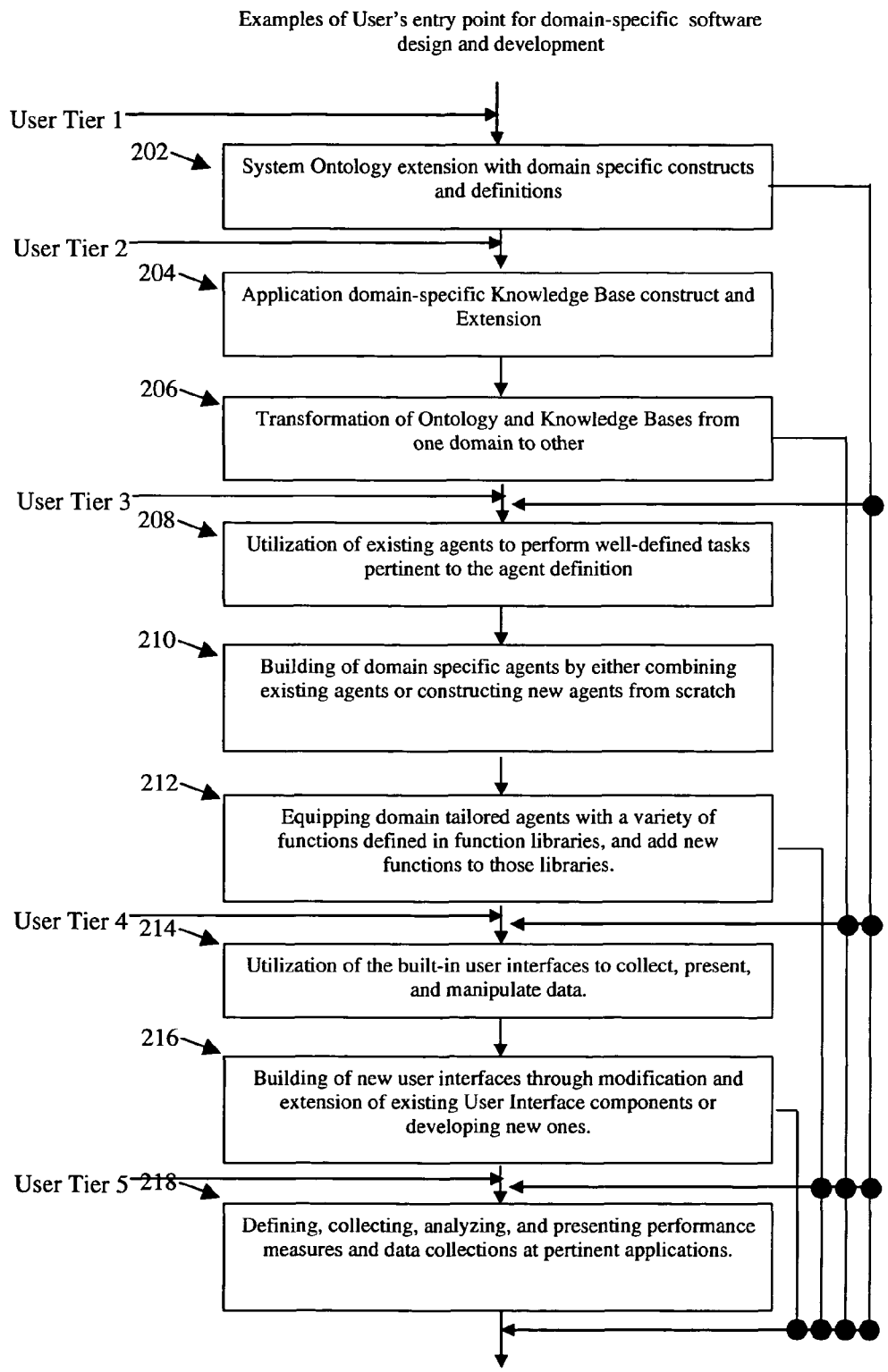
Figure 5. Illustrative functional diagram of a tiered structure of user interaction in the present invention.

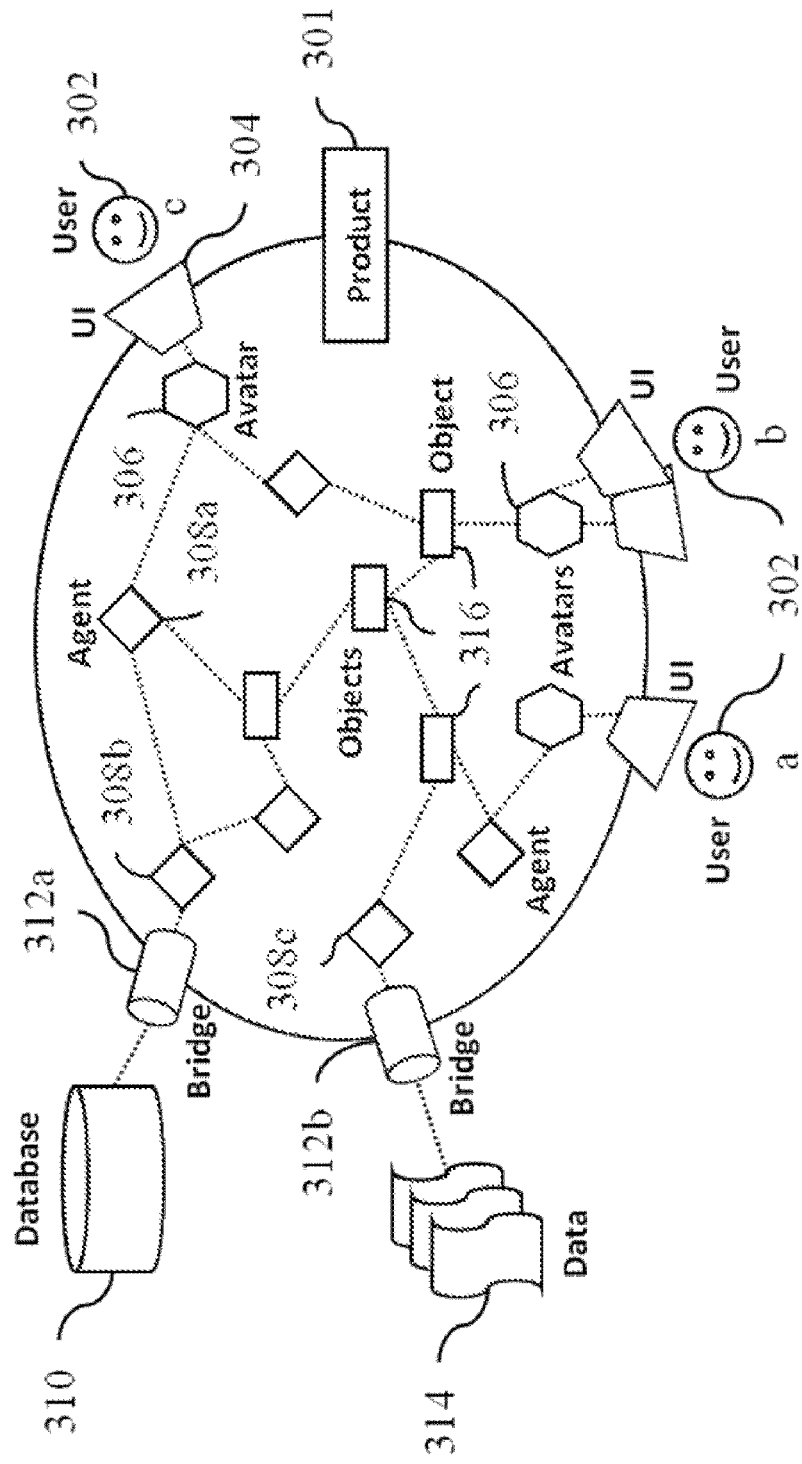
Figure 6. An illustration of agent-user interaction along with other components of the software system.

(2) Human-oriented user interfaces
- Provide conceptually natural means for users to interact with multiple distributed agents and functional components.
- Provide integral support for the construction of multi-modal interfaces.

(3) Realistic software engineering compliance.
- Encourage reuse of domain-independent and specific components.
- Support multiple platforms.

(1) Versatile mechanisms of agent interoperation and coordination
- Provide flexibility in assembling communities of agents and agent functions.
- Provide flexibility in structuring cooperative interactions among the members of a community of agents.

Figure 7. Functional modules in exemplar categorization

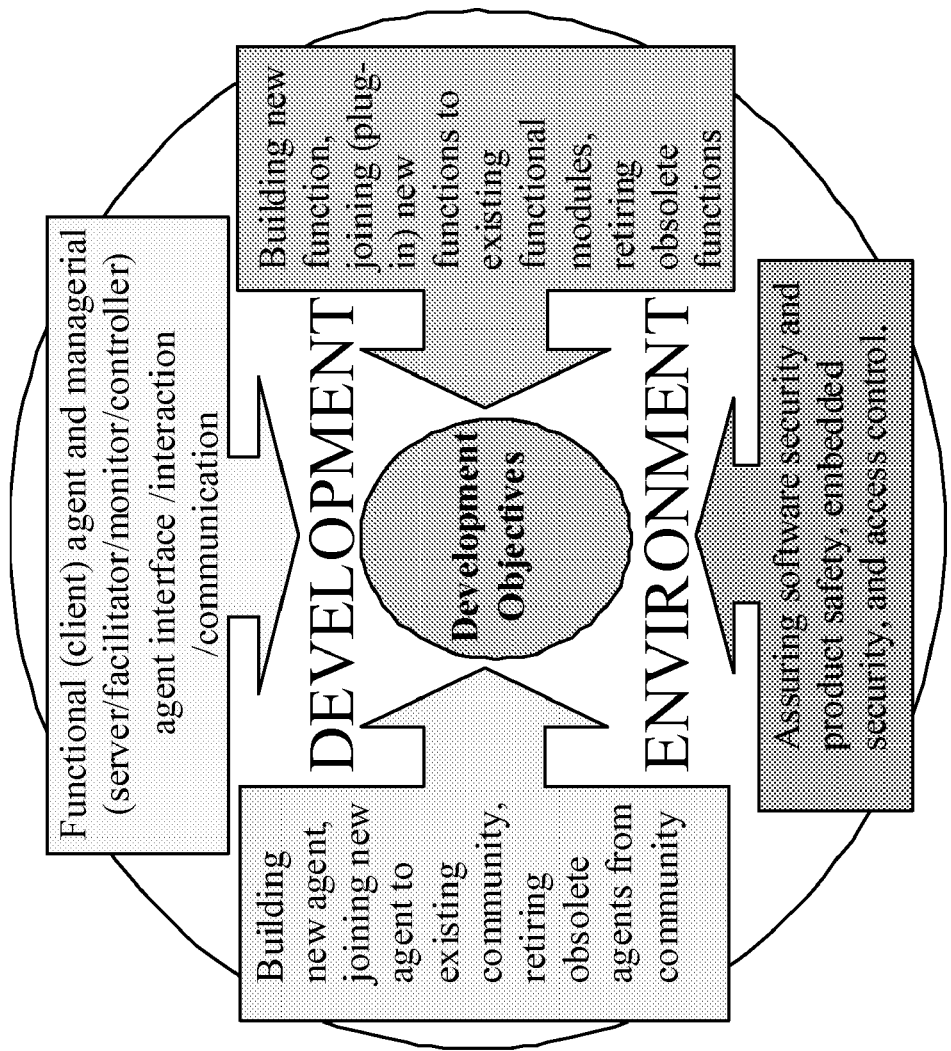
Figure 8 Illustrative diagram of the system development functionality.

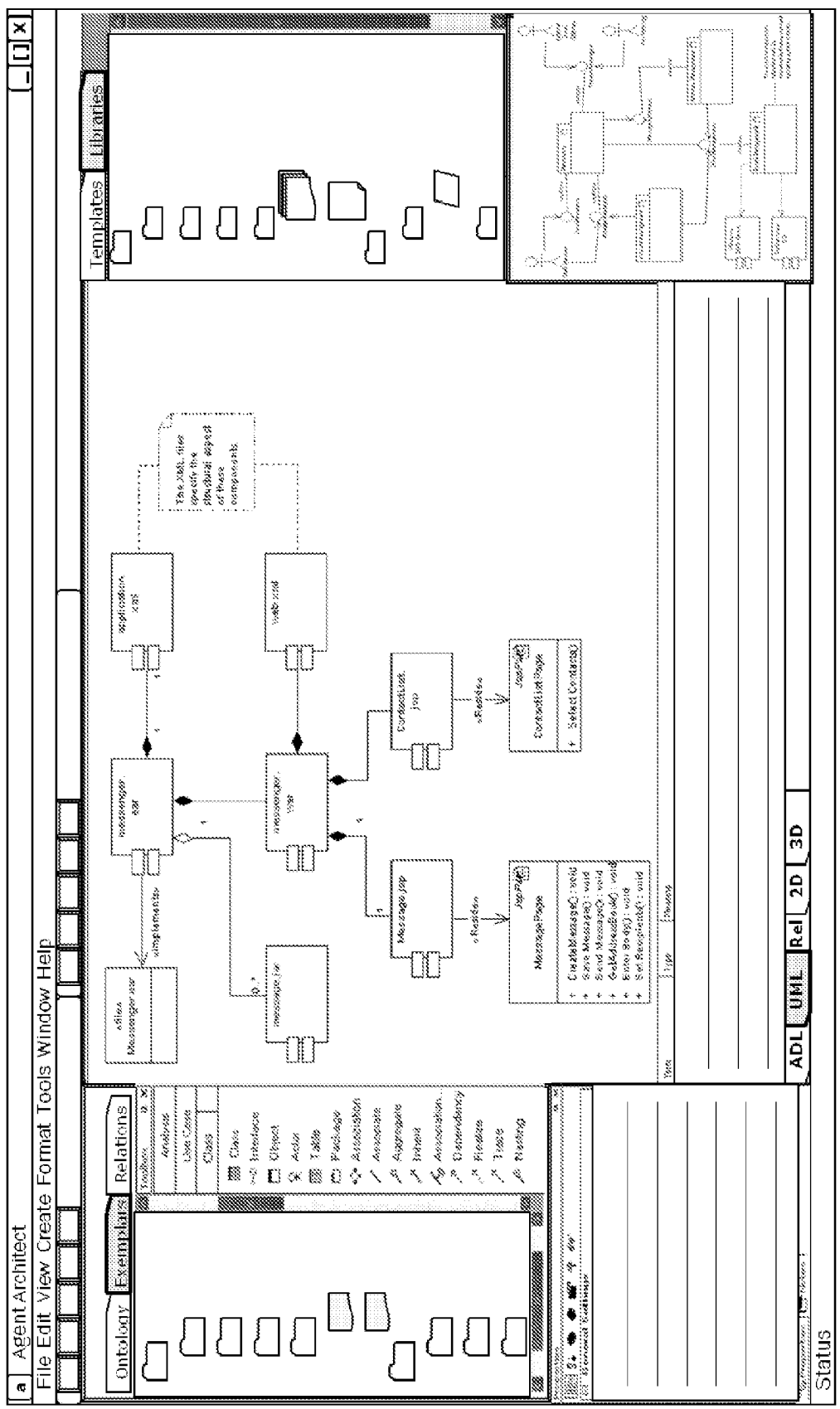
Figure 9. An illustration of the functional development environment of the inventive system.

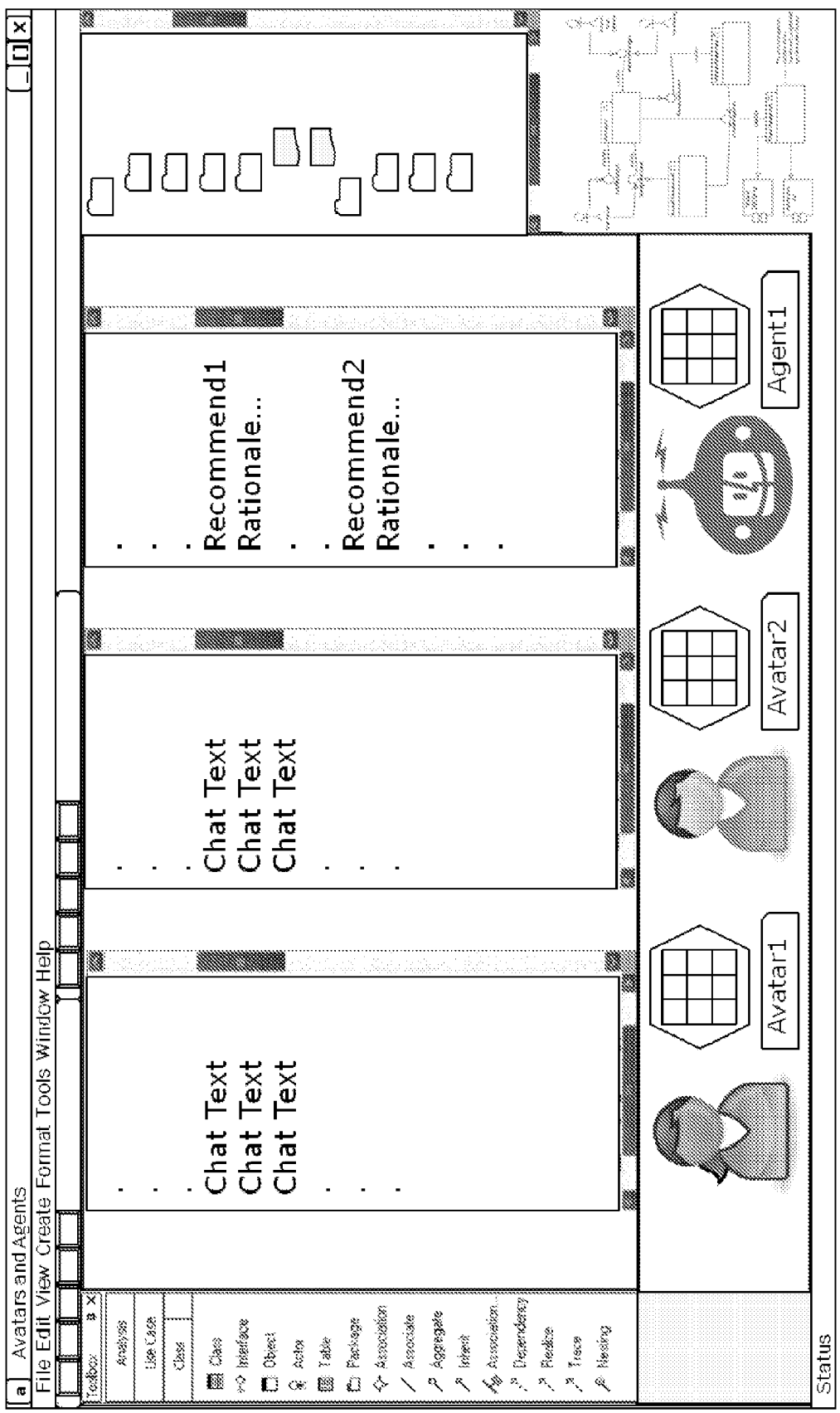
Figure 10. An illustration of Avatar representations in a multi-agent system.

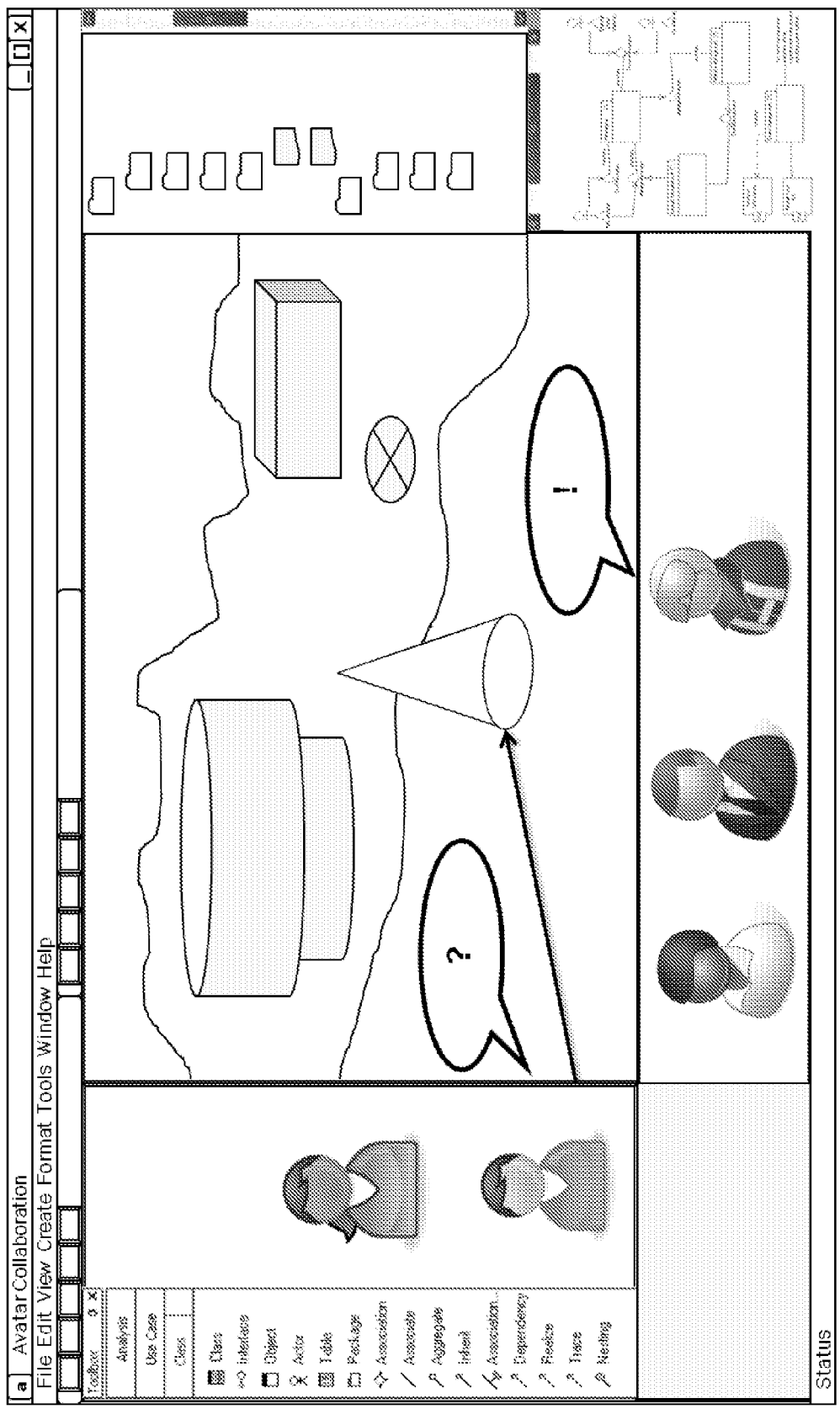
Figure 11. An illustration of Avatars interactions as an intuitive means of user-agent interactions in the software development environment.

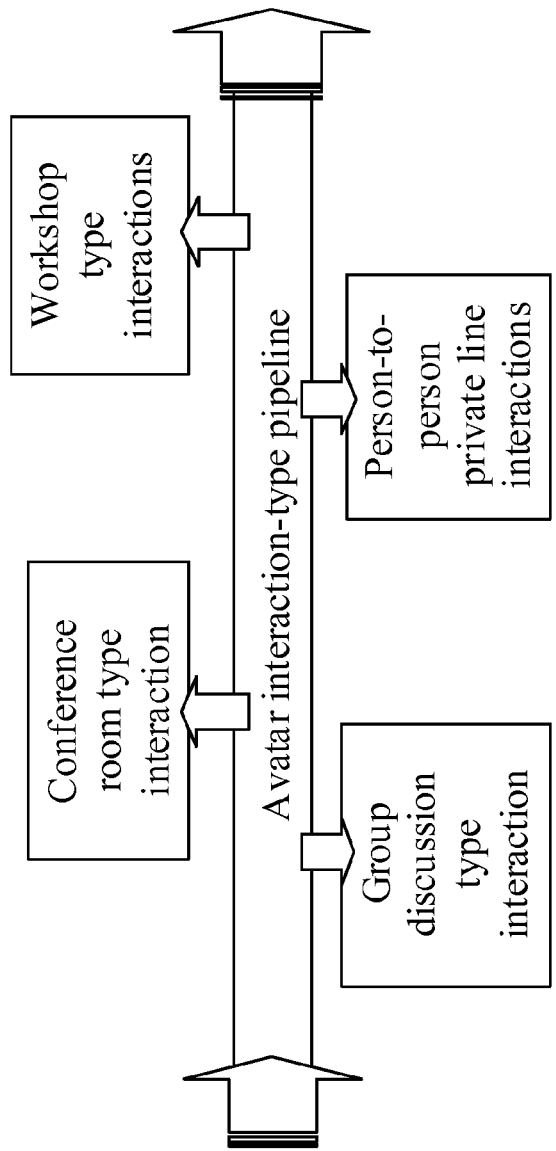
Figure 12. Functional view of Avatar (a kind of agent that takes on behavior of human users and operators) interaction types in the inventive software development environment.

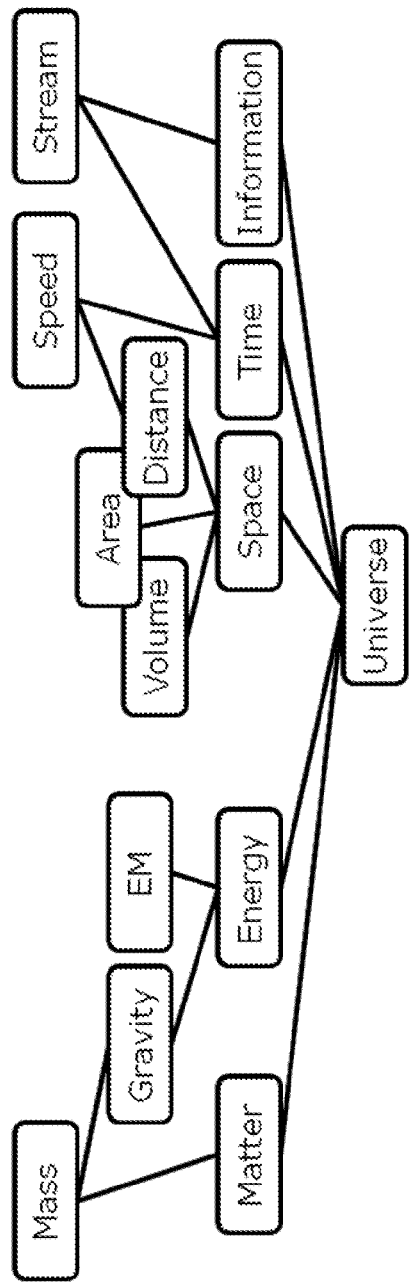
Figure 13. An illustration of an Ontology layer structure for the progressive specialization of the domain of application for the software development environment

SYSTEM AND METHOD OF PROGRESSIVE DOMAIN SPECIALIZATION PRODUCT SOLUTIONS

FIELD OF THE INVENTION

The present invention relates to a software development infrastructure and methodology in, for example, multi-platform computing environments as well as other standard environments. More specifically, this invention relates to a software development system, its paradigm, approaches and constructs, for providing, for example, in at least one embodiment, a lattice-based organization of interdependent software product series in multi-dimensional application specializations starting from a generic root product node and extending to more domain specific extensions in multiple tiers of complexity. Other embodiments of the invention are also disclosed, as well as the applicability of one or more features of the present invention to various computing environments.

BACKGROUND OF THE INVENTION

Traditionally, software development systems and products are provided and targeted to a certain level of users. These products may employ several methodologies for delivering scalable products and adaptive architectures, such as with 3GL (Third Generation Language) and 4GL (Fourth Generation Language) systems. However, these systems have been limited in their ability to include and provide for different knowledge and skill levels of users and progressive specialization of the product to various application domains. That is, these systems have poor extensible capabilities and are not adaptive.

Other software development systems and products have attempted to utilize intelligent agents to perform specific tasks or functions within a network environment. However, uses of agents have generally been limited to specific groups of users at a uniform level of expertise. In addition, intelligent agent functions have mostly related to desktop/office system functionality—e.g., automatic spelling correctors, automatic email address selectors, etc.

One more recent intelligent agent system has involved the use of a tactical intelligent agent for decision making in the area of air combat by the present inventor in U.S. Pat. No. 6,360,193, entitled "Method and system for intelligent agent decision making for tactical aerial warfare," to Alexander D. Stoyen, and assigned to 21$^{st}$ Century Systems, the assignee of the present application, the details of which are hereby incorporated by reference. In Dr. Stoyen's system, intelligent agents collaborate among themselves either in a homogeneous (i.e., among intelligent agents of the same type) or heterogeneous (i.e., among intelligent agents of different types operating in a common problem space) environment.

These intelligent agents also collaborate with human users, and accept real-time corrections to the "environment" (as it perceives it) from the user (either in delayed or in real-time fashion). These intelligent agents further take into consideration such factors as mental and physical state of a human user, including user degree of fatigue, stress, etc.

In Dr. Stoyen's AWACS Trainer Software (ATS), which is one exemplary application of the present invention, there is a tactical intelligent agent for decision making in the area of air combat. Other situations may also be used with the present invention as described below in more detail. The agent is tactical because it considers not only immediate certainties and near certainties (e.g., if a hostile fighter is not shot at it will shoot at us) but also longer-term possibilities (e.g., if the bulk of our fighters are committed early, they may not be available should an enemy strike force appear in the future). The agent is intelligent because it exhibits autonomous behavior and engages in human-like decision process. The agent assists in decision making in the area of air combat because the agent gives explicit advice to human AWACS Weapons Directors (WD) whose job it is to coordinate air combat. The agent is also capable of making independent decisions in the area of air combat, replacing a human WD.

ATS employs groups of collaborating intelligent agents for decision making. The agents are collaborating because not every agent has all the information regarding the problem at hand, and because global decisions are made that affect all agents and humans, on the basis of agents exchanging, debating and discussing information, and then making overall decisions. Thus for instance, agents assisting individual WDs exchange threat information and then coordinate their recommendations, such as what fighters to commit to what enemy assets, without resource collisions. That is, an agent A will not recommend to its WD A to borrow a fighter pair P from another WD (WD B) while WD B's agent (agent B) recommends to WD B to use the same fighter pair P to target another threat.

ATS supports collaboration among (a heterogeneous set of) intelligent agents and a combination of (a heterogeneous set of) intelligent agents and humans. The set of agents is heterogeneous because it includes role-playing agents (e.g., an agent that plays a WD) and adviser agents (e.g., an agent that recommends a particular fighter allocation to a WD) (as well as other agents). The set of humans is heterogeneous because it includes WDs and Senior WDs (different roles, a.k.a. SDs). Agents and humans collaborate because agents and humans jointly perform air combat tasks.

ATS also provides a feedback loop between an intelligent agent and a user. Agents and users (humans or other agents) exchange information while ATS is processing. As changes occur (e.g., new planes appear), agents and users exchange this information and agents, naturally adjust (as do the users). For instance, as a pair of fighters becomes available, an agent may recommend to the human WD how to assign this pair. WD's reaction results in the agent learning what happened and possibly how to (better) advise the WD in the future. In particular, the agent may also change its perception of the environment. For instance, a repeated rejection of a particular type of agent recommendation may result in the agent re-prioritizing objects and actions it perceives.

ATS provides intelligent agents representing multiple users (e.g., impersonating or assisting WDs, SDs, instructors). These agents collaborate, as already illustrated. However, the agents do not all perceive the environment the same way. For instance, an agent representing WD A may only be able to probe the status of the planes WD A controls. An agent representing another WD B may only be able to probe the status of the planes controlled by WD B. An agent representing an SD is able to probe the status of a plane controlled by any WD that reports to the SD. A strike WD may command a stealth bomber which does not show on AWACS radar, and thus even its position and movement are not visible to the other WDs.

In ATS, intelligent agents learn over time by accumulating knowledge about user' behavior, habits and psychological profiles. An agent may observe that a WD it advises tends to always accept recommendations to target advancing enemy with CAP'ed (engaged in Combat Air Patrol assignment) fighters but never with fighters on their way to tank (even though the agent may consider these fighters adequately fueled and otherwise ready for another dog-fight). The agent may then over time learn not to recommend the WD assign fighters on their way to tank to other tasks.

The intelligent agent may observe that a WD tends to press mouse buttons more times than it needed, to accept a recommendation. This conclusion may lead the agent to believe that a WD is overly stressed out and tired. The agent may then recommend to the SD's advising agent to recommend that SD consider rotating this WD out. Perhaps as a compromise, the two agents and the two humans (the WD and the SD) may then decide that the best course of action is for the WD to continue for a while but that no fighters be borrowed for other tasks from this WD, and that after the next air combat engagement, the WD be rotated out anyway.

In addition, multiple intelligent agents and humans may be involved in the ATS decision making process, and differences in opinion as to what constitutes the best course of action may result. The reasons for the differences include the following: non-uniform availability of information (e.g., a particular agent may be privy to detailed information on the planes that belong to its WD only), strategy preferences (e.g., a particular WD may be very risk-averse compared to others), and one group's considerations vs. another group's considerations (e.g., a WD (and its agent) may not wish to loose a pair of fighters; on the other hand, from the point of view of the entire WD team, it may be acceptable to send that same pair of fighters to divert enemy air defenses (at a great risk to themselves) away from a strike package). Given the differences in opinion, the ATS agents exchange opinions and debate options, among themselves and with humans. Standard resolution protocols may be used to ensure that an overall decision is reached after a final amount of such exchanges. Examples include standard neural networks, standard ether net collision resolution, standard packet collision resolution, standard two-phase commit in databases, and other standard negotiating techniques. Also, in an operational or training setting, the SD (or other human in charge) can ultimately force a decision, even in disagreement with agents (or humans).

While the ATS system and the developments described in U.S. Pat. No. 6,360,193, entitled "Method and system for intelligent agent decision making for tactical aerial warfare," achieved its goals for its specific purpose, there has not been a functionality and a methodological solution available for the creation, management, modification and extension of software agent systems that span a hierarchically layered construct of both general and specific application domains. Further still, the traditional systems have not provided for coordination among agents in an integrated environment of software development for progressive specialization. Agent Construction Toolkits have been traditionally limited to specific application domains, and do not span a broader range of general and specific domains of applications and/or functionality as in the present invention.

BRIEF SUMMARY OF THE INVENTION

Traditionally, software development systems and products are provided and targeted to a certain level of users. These products may employ several methodologies for delivering scalable products and adaptive architectures, such as with 3GL (Third Generation Language) and 4GL (Fourth Generation Language) systems. However, these systems have been limited in their ability to include and provide for different knowledge and skill levels of users and progressive specialization of the product to various application domains. That is, these systems have poor extensible capabilities and are not adaptive. Other software development systems and products have attempted to utilize intelligent agents to perform specific tasks or functions within a network environment. However, their uses of agents have been limited to specific groups of users at a uniform level of expertise. There has not been a functional and a methodological solution available for the creation, management, modification and extension of software agent systems that span a hierarchically layered construct of both general and specific application domains. Further still, the traditional systems have not provided for coordination among agents in an integrated environment of software development for progressive specialization. Agent Construction Toolkits have been traditionally limited to specific application domains. They do not span a broader range of general and specific domains of applications and/or functionality as in the present invention.

The concept of software agents is currently one of the most exciting new developments in computer software technology. Agents can be used to quickly and easily build integrated enterprise software systems. On one hand, software agents, like people, can possess different levels of competence at performing particular tasks; on the other hand, software agents provide a powerful new method for implementing the next-generation software development systems that can be far beyond human's reach if without the functionalities it provides.

Multi-Agent Systems Development

Multi-agent systems (MAS), which consist of multiple software agent modules that communicate and cooperate with each other, can solve complex problems on behalf of humans in computer technology areas including military and civilian applications. One great benefit of multi-agent systems is their scalability. Since they are modular, it is easier to add new agents to a multi-agent system than it is to add new capabilities to a monolithic system.

In general in a MAS, (i) each agent has a partial capability to solve a problem, (ii) there is no global system control, (iii) data and knowledge for solving the problem are decentralized, and (iv) the computation is asynchronous. The agents work collectively so that, as a group, their behavior solves the overall problem without disruption, conflict, and glitches.

In conjunction with MAS there are also toolkits and development environments. Multi-agent based software toolkits and developer environments are useful for the design and development of Knowledge Intensive Systems, such as the decision support systems in business, enterprise and military applications. The term "Knowledge Intensive Systems (KIS)" represents a broad range of applications that deal with the representation, accumulation, processing, management and, in some cases, generation of knowledge. KIS in military applications can include mission or logistics planning systems, tactical and strategic decision support systems, autonomous systems such as robots, Unmanned vehicles/Unmanned Air vehicles/Unmanned Ground Vehicles/Unmanned Undersea Vehicles (UV/UAV/UGV/UUV), and auto-weaponry, infrastructure maintenance and diagnosis systems, data/sensor fusion systems, heterogeneous distributed collaboration systems, information assurance and network security systems, etc. KIS in commercial applications can include market analysis, engineering design, transportation scheduling, goods distribution planning, process management, etc. All these systems can be addressed, in accordance with the present invention, with a generic agent- and knowledge-based architecture of software development system as further set forth in this document.

Most MAS deal with the activities and processes in which cooperative or coordinated agent operations are mostly desirable. Such activities include:

Acquiring data and information through queries and access of information resources, Transforming the acquired data and information into knowledge, Refining and storing that knowledge, and Drawing on and using the knowledge for better business and enterprise operations.

A domain specific MAS, it has been determined, may have some distinct features from other MAS that deal with applications in different domains. This is an important factor that requires great attention to MAS based software system developers. On the other hand, many MAS are designed to perform at least a common set of operations that are required in most applications, such as Acting on the basis of information and activities taking place on the Web, Providing real-time decision support through actively querying, collecting, and mining the information on the Web, and Supporting effective and efficient user-computer interactions while conducting business in the networked environment.

Both these factors are imperative when dealing with the software development process.

Development of multi-agent system (MAS) applications is often complicated by the fact that agents operate in a dynamic, uncertain world. Uncertainty may stem from noisy external data, variants of the agent's operation environment, inexact reasoning such as abduction, and actions by individual agents. Uncertainty can be compounded and amplified when propagated through the agent system. Moreover, some agents, through a temporary or permanent disability of themselves or their communication channels, may become disconnected from the rest of the system, resulting in incomplete/inconsistent system states.

In accordance with at least one embodiment of the present invention, a software development solution of MAS comprises of frameworks, methodologies and functionality/toolkits that support the rapid development of multi agents at the component levels and control interaction at system levels. A culmination of carefully synthesized innovative agent technologies often provides an integrated environment for the rapid development of multi agent systems. A diverse set of users with different technological background and skills can benefit from such environment to work at either a higher level or lower level of abstraction than that required by the conventional programming languages and program development environment.

Advanced Software Development Environment and Toolkit

Referring to the software development environment and toolkit, software developers of agent systems have come a relatively unsophisticated way in terms of basing the software operations on a set of pre-specified functionality. For example, the whole field of database design and implementation has not been evolved to keep with networked agent architectures. This is the case despite the fact that the way information is stored and retrieved has changed significantly in the past two decades along with the presence of huge data stores and warehouses developed over the Internet. Today, information necessities for enterprise operations are kept separately on different machines on the global network so that every authorized person has immediate access through the Web. The tremendous advantage with this approach was that distributed processing performed by local software agents could be done on different machines anywhere remotely. The added throughput of these machines not only enhanced efficiency, but also made the architecture easily expandable since new data resources could be easily added to the existing network without disrupting the existing systems. Also, applications started becoming more complex in terms of knowing which data resources to connect as well as keeping track of the data schema on each one of the resources. These tying links make the use of intelligent agent architecture necessary for allowing a user to submit his/her query and preferences to an agent which will know which data resources on the Internet to get the information from. In accordance with at least one embodiment of the present invention, however, the data resources need a generic agent interface that will allow this agent to accurately state a query and retrieve the results, thus allowing the decision-making Web-agent to act autonomously as a connecting point for all the data resources.

An issue in performing such tasks is the challenge of actual implementation. It is very important to understand the issues in designing, constructing, and implementing such an agent-based system. For example, new computing platforms are rapidly evolving thus requiring different methodologies and new system paradigms. The design and construction process involves blending of multiple diverse fields such as client-server development, Web-to-Web and Web-to-database connectivity, semi-centralized or fully distributed controls, machine learning for "intelligent" data mining engine, etc. There are also some other practical considerations such as the agent cooperation in networked environment, and user privacy and security issues. Since the Internet allows virtually any kind of machine to connect to it, there is the issue of defining standard interfaces that can be implemented independent of platforms. It becomes very important to understand the technologies and approaches that are needed to construct these agent-based systems.

Further, a number of individual architectural approaches to building agent-based systems and/or architectures (AAs) are being used as research platforms and/or for the enterprise marketplace. Virtually all AAs attempt to address the problem of defining and designing agents and multi-agent systems through a specific set of rigid rules and policies, quite often with a particular application domain in mind. AAs generally have a narrow and very specific definition of the computational model of agents (often in a specific programming language, most frequently Java) and the associated agent communication and coordination mechanisms, which are also pinpointing specific, depend on domain and implementation.

Such AAs do not define an agent-based software methodology in a domain independent manner. Further, traditional AAs do not provide generic agent and agent interaction models that can be specialized in a hierarchical manner to reach the specificity of a particular application domain. These shortcomings of traditional AAs are manifested in the incompatibility of various agent-based environments—presently no true unified, domain independent, agent architecture exists in the state of the art.

Modern software systems are constructed by integrating a number of diverse components from a variety of sources. Some of these components are built as special-purpose applications, some are pre-existing (legacy systems), some are commercial off-the-shelf (COTS) software components, some are built in-house, and some are purchased from third party vendors. Much of the complexity found with the existing software development paradigm is a result of the way that different types of software components are pieced together. In order to ensure the quality of such a system, novel techniques are needed to integrate and evaluate the resulting connections of the various components. It has therefore been determined that it is desirable to allow end users of software systems to develop their own systems that meet their specific needs using user-friendly and efficient software development tools, components, and environments; i.e. a "language" that the end-users can be used readily and conveniently to form their own agent system applications.

It has also been determined that the field of MAS software development can benefit significantly by focusing on the development of advanced software structures through employment of agent-based technologies. Given the characteristics of most agent application domains and situations, it seems that the most natural way to provide timely and critical support to end-user software development processes is to have a collection of distributed, autonomous problem solving agents that are scalable, adaptive, and readily assembled and placed in operation.

It has been determined that to the knowledge of the inventors, there are no systems or methods that provide the levels and sophistications necessary for the construction and application of MAS for multi-user specialization of products through an application development functionality and/or suite of functionality in a cooperative environment.

The present invention is directed, in at least one embodiment, to a system methodology and integrated solution for progressive domain specialization of software products. The present invention allows users at different levels of skill and domain-specialization to use a product line. A lattice-structure-based organization of interdependent products can be offered to solve the problem of multi-dimensional product specialization.

The original meaning of the word "lattice" in mathematics points to some mathematical structures that are required to satisfy certain relational rules defined in classic set theory. The structure has certain rather restricted definitions for the nodes at different layers of the lattices. Our software "lattice" is based on the similar definition, but with a rather broader meaning in terms of the fact that the multi-facet software products of the inventive system are abstracted as linked nodes in a layered graph where each node can be clearly identified as belonging to certain layer of the graph. A product node has connections with the product nodes at the immediately upper layer (named parent nodes) of the graph structure, which complies with the original definition of a lattice. But the product nodes basically do not have connections with the product nodes at the same layer. In alternative embodiments, however, product nodes of the same layer can communicate and/or have connections with each other. Conversely, a product node at a lower layer of the lattice is called a child node with respect to the product node at the higher layer of the lattice. A child product node is also called a product derivation and possesses an inheritance relation with its connected upper level nodes, the parents.

In the lattice organization of interdependent agent-based software products, each lattice node N of the software product is used in solving problems of multi-dimensional domain specialization by starting from a generic root product node and extending to more domain specific extensions in multiple tiers of complexity. The functionality is further extended by the children of node N in respectively new, more specialized domains. Further, the lattice structure of interdependent, product nodes, inheriting functions and capabilities from the more generic to the more specific application domains, also provides an infrastructure for control, coordination and cooperation of related agents that comprise the product nodes at each level. Thus, the agents of product node N of the lattice are semantically compatible with all agents in the parent nodes of N as well as with some agents in the children nodes of N. Such compatibility is important when a scalable product structure design is necessary to promote reuse and avoid the pitfalls of vertical integration. In alternative embodiments, however, not all agents or groups of agents are necessarily compatible. For example, groups of agents that may be compatible with each other may interact with one or more other agents in a specific manner, where these one or more other agents are compatible with yet other agents in the software architecture.

In one embodiment of the lattice structure of the software product family, the products would start with a generic root product node and extend to more domain-specific extensions in multiple tiers of complexity. Each node N in the lattice is related to one or more higher-level nodes (parental products) and multiple lower-level nodes (children). The parents of node N provide higher-level functionality, which is inherited by N, while the children extend N's functionality in specific application domains. Each of the lattice nodes is a specific software product within the product line to serve a specific domain of application or support a set of application domains. In this lattice structure, parents and children are not necessarily organized in a strict tree structural relationship, but can cross-reference parents and children of sibling nodes (see diagram). Such multi-tier product approach in accordance with this embodiment is specifically used in the creation of agent-based applications from generic domain-independent infrastructure agent functionality to progressively more domain-specific agent behavior. The resulting software product then is a domain-independent framework, from which a wide variety of knowledge intensive systems can be built for varieties of applications. Illustrated in FIG. 3, an example of the lattice structure, and its consequent sub-products organized as the lattice nodes in FIG. 4.

Also within the present invention, an optional or featured methodology for the creation, management, modification, and extension of a set of software functionality/tools for software agent system applications is developed. In the methodology, in one embodiment, software agents are constructed either from empty agent templates or from existing components (other agents and algorithms) through the use of, for example, an Agent Definition Language (ADL) described in more detail later in this patent disclosure. The ADL employs, for example, an exemplar-based ontology and incorporates both domain specific and domain independent features for agent interfacing, communication, cooperation, and security. The functionality and/or integrated tool suite treats agents, users, components, and algorithms as, for example, first class entities that are orthogonal, substantially orthogonal and/or related to those functionalities such as visualization, human-computer interactions, security, version control, and other data access tasks. Using this functionality, a system designer in essence becomes part of the system organization and optionally develops system components at a highly abstract level in an iterative, interactive fashion, while the system implements a uniform user-agent interaction framework at detailed levels automatically. The agent-based functionality/tools are advantageously user-friendly, adaptive, and versatile, as described in the later sections of this text.

A sample agent template, i.e., a schematic illustration of an initial building block is shown in FIG. 1. Example of the screen or objects that are presented to a system designer, i.e., the development environment is shown in FIG. 2.

Additionally, in alternative and/or additional optionally embodiments, methods for a system design are provided that allow agent applications to locate, select and/or utilize existing algorithms, located in libraries, and identified by specific functional and/or non-functional interface descriptions. Specifically, the developer's agents use, for example, one or more of semantic search, parameter transformations, dynamic code generation and compilation, exemplar-based ontology transformations and other techniques to select a set of applicable algorithms from a library. Agent-based domain-specific criteria evaluation and learning is optionally used to evaluate, rank and select among the available algorithms Dynamic code management is used to instantiate the library code, to apply a sequence of ontology morphism over the parameter space and to interpret the results in the domain-specific frame. The method could be fully automatic or semi-automated, determined by the specific application system developer, with optional human interactions serving as additional search criteria and constraints providers.

In this inventive system, an agent management and coordination mechanism is provided that uses, for example, a belief-semantic messaging infrastructure to convey implicit coordination information among agents. The coordination is achieved through, for example, message routing in the network of agents which is describe later based on semantic encoding and semantic distances. Since agents in this framework operate in at least one embodiment on a probabilistic exemplar-based Knowledge Representation (KR), the semantic messages, combined with belief-space operators for modeling trust and uncertainty are sufficient to provide a loosely-coupled multi-agent control structure. In this model, semantic messages formulate not only the shared knowledge space, but also the appropriate actions to be taken by the participants in the communication. The temporal aspect of control can be treated as an extension of the knowledge space and thus can be included in the event-based coordination mechanism. Such multi-agent coordination approach is more generic and can emulate a number of other coordination schemes such as client/server, subscribe/broadcast, or voting/bidding. This leads to a new paradigm of system integration, where entire traditional paradigms of agent-based computing can be integrated through mapping their control mechanisms to the semantic messaging paradigm. Other frameworks may alternatively be used with and/or combined with the present invention.

Even further, the present invention provides, in at least one embodiment, an optional methodology for creating, maintaining, and progressively updating an agent systems development environment. The resulting agent development environment provides automated and inherent security of execution, data integrity and balanced resource utilization based on methods and/or functionality used for agent construction. Since agents and their interactions are carefully constructed in accordance with the present invention, the agent system development environment and incorporated functionality/tools in at least one embodiment can verify and guarantee certain security properties of the agent applications being developed. Such optional automated validation of the system security properties includes behavior verification, resource usage analysis, worst-case and average performance guarantees, data access control, information integrity, and/or management of uncertain information and others. Further, the advantageous and optional exemplar-based knowledge representation (KR) and semantic messaging model ensure that information and control is distributed only to agents that both have the need to know and have the capacity to process that information and requested tasks.

In one embodiment of the invention, a method uses a multi-platform computing environment for software development utilizing progressive specialization of a line of software products. The method includes providing a multi-tiered product dependency lattice for progressive specialization of software applications, and defining interdependent software products within said lattice. The lattice starts with a generic root product and extends to more domain specific product extensions, specifies a starting node, its internal construct, and methods of computing in the lattice for the general purpose software development and for the extensions to specific applications. The method provides a set of relations from the node to one or more parent nodes and one or more child nodes within the lattice. One or more parent nodes and one or more child nodes can cross reference parents and children of sibling nodes, respectively.

In another alternative embodiment of the invention, a method in a computing environment creates and manages one or more software agents. The method includes the sequential, non-sequential and/or sequence independent steps of constructing one or more software agents using at least one of one or more predetermined agent templates and one or more software components responsive to at least one semantic based construct. The software components is optionally a combination of other agents and algorithms. The method manages the software agents, users, software components and the algorithms as system entities that are responsive to human-computer interactions, security, and data accesses.

In another alternative embodiment, a method in a computing environment coordinates and/or integrates at least two software agents and includes the sequential, non-sequential and/or sequence of conveying implicit coordination information among the at least two software agents utilizing a plurality of semantic messages, and combining said plurality of semantic messages to provide a multi-agent control structure, and routing conveyed information messages among the software agents based on semantic encoding and semantic distances between agents.

In another alternative embodiment, a multi-tiered product-line integrated method for developing generic and application specific agent based applications utilizes one or more software components to achieve progressively more domain-specific behavior. The method represents the software components and optionally a more domain specific component as one or more nodes within a lattice network, and extends the nodes with domain specific information, knowledge representations, functional behaviors and user interfaces. In addition, the method provides an integrated set of tools, algorithms, protocols and component libraries that create and manage one or more software agents for use in an application program.

In another alternative embodiment of the invention, a method provides a flexibly constructed single and/or multiple folded threads and provides software products in hierarchical levels of a lattice, wherein the software products are for different application domains.

In another alternative embodiment of the invention, a software development method utilizes software products and includes the sequential, non-sequential and/or sequence independent steps of defining related software products within the multi-tiered product dependency lattice including at least one of a generic root product and a domain specific product, specifying at least a first node, a construct, and a method of computing in the multi-tiered product dependency lattice for the software development and the progressive specialization, providing a set of relations from said first node to at least one other node within said multi-tiered product dependency lattice, and developing software using the multi-tiered product dependency lattice via the software products implemented in the software.

In another alternative embodiment of the invention, a computing system for software development, includes at least one software agent implemented in the computer system in a first lattice location; a component library structure implemented in the computer system in a second lattice location; and an access methodology implemented in the computer system in a third lattice location. The software agent and component library are organized in a representation and access schema using the access methodology and selectively interact via at least two of said first, second and third lattice locations. In alternative embodiments, one or more lattice locations, and interactions therebetween may be used.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constrictions insofar as they do on depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

For a better understanding of the present invention, reference may be made to the accompanying drawings in which:

FIG. 1 shows a sample agent template, i.e. the initial building block, coded in a software modeling language format.

FIG. 2 shows an example of the screen and objects that are presented to a system designer for a particular application domain, i.e. the application development environment of the inventive system.

FIG. 3 is an illustrative diagram of domain specialization with some exemplary products of the present invention;

FIG. 4 is an illustrative diagram of the inheritance and propagation features in a lattice of the present invention;

FIG. 5 is an illustrative functional diagram of a tiered structure of user interaction in the present invention;

FIG. 6 is an illustration of agent-user interaction along with other components of ane exemplary system and the communication links among them;

FIG. 7 illustrates the functional modules in exemplar categorization of the agent modules in the inventive system.

FIG. 8 illustrates the system development functionality in the context of a practical software development environment.

FIG. 9 is an illustration of the functional development environment of the inventive system.

FIG. 10 is an exemplar illustration of Avatars representation of human users in the multi-agent system.

FIG. 11 is an illustration of Avatars interactions as an intuitive means of user-agent interaction in the software development environment.

FIG. 12 is a functional view of Avatar (a kind of agent that on behave of human users and operators) interaction types in the inventive software development environment.

FIG. 13 is an exemplar illustration of Ontology layer structure for the progressive specialization of the domain of application for the software development environment.

DETAILED DESCRIPTION OF INVENTION

Reference now will be made in detail to the presently preferred embodiments of the invention. Such embodiments are provided by way of explanation of the invention, which is not intended to be limited thereto. In fact, those of ordinary skill in the art may appreciate upon reading the present specification and viewing the present drawings that various modifications and variations can be made. For example, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

According to one or more the embodiments of the present invention, various views are illustrated in FIGS. 1-3. Like reference numerals are being used consistently throughout to refer to like and corresponding parts of the invention for all of the various views and figures of the drawing. Also, please note that the reference number for a given item or part of the invention should correspond to the Figure in which the item or part is identified.

The present invention is directed to a system and method for providing progressive domain specialization of software products that allows users at different levels of skill and domain-specialization to use the product line. In a preferred embodiment of the present invention, a method and tool set is to provide a computing environment for a progressive domain specialization in a lattice organization of interdependent agent-based software products. Such lattice of products is to be used in solving problems of multi-dimensional domain specialization by starting from a generic root product node and extending to more domain specific extensions in multiple tiers of complexity.

In at least one embodiment of the inventive multi-tier solution, each Node N in the lattice is related to one or more higher-level nodes (parent products) and multiple lower-level nodes (children). For example, the parent nodes provide a higher level of functional generality and abstraction. Node N inherits from its parents and is capable of using and extending their functionality within specific application domains. The children of node N in respectively lower level penetrate more specialized domains that further extend the functionality of N.

The capability of inheriting definitions, representations and functions and to evolve those from the generic to more specific application domains also advantageously and optionally provides an infrastructure for control, coordination and cooperation of related agents that comprise the product nodes at each level. Thus, the agents of product node N of the lattice are semantically compatible with all agents in the parent nodes of N, as well as, with some agents in the children nodes of N. Such compatibility facilitates a scalable product structure design to promote reuse and avoid the pitfalls of vertical integration.

The system of the present invention comprises a number of optional functional modules in its product lines. These modules can be categorized as (1) versatile mechanisms of agent interoperation and coordination; (2) Human-oriented user interfaces; and (3) realistic software engineering compliance. Relationships of these modular categories are shown in FIG. 7.

More specifically, in at least one embodiment the versatile mechanisms and component modules provide flexibility in assembling communities of agents and agent functions—both at development time and at runtime. They also provide flexibility in structuring cooperative interactions among the members of a community of agents. The modules further impose the right amount of structure on individual agents. Further still, the modules include legacy and "owned-elsewhere" functions that are optionally necessary within some domains of applications.

The Human-oriented user interface modules provide conceptually natural means for users to interact with multiple distributed agents and functional components. They also provide integral support for the construction of multi-modal interfaces, including the handling of users' requests expressed in text, voice, imagery, and other means. Additionally, the modules treat users as privileged members of the agent community. Further still, the modules support collaboration i.e. simultaneous work over at least some shared data and optionally processing resources, between users and/or agents.

The realistic software engineering compliance modules, shown as item (3) in FIG. 7, minimize the effort required to create new agents, and to wrap existing applications by reusing many of the agent modules developed elsewhere. The modules encourage, for example, reuse, of both domain-independent and domain-specific components. Further still, the modules optionally support lightweight, mobile platforms. Even further, the modules optionally minimize platform and language barriers to the creation of new agents, as well as wrapping of existing applications.

The optional product line of at least one embodiment of the inventive system enables users to easily and optionally define domain-specific ontology of terms and to construct knowledge representations based on this ontology. Users can then create agents and agent behaviors for the domain specific knowledge representations. Agents can be tailored to perform a variety of tasks, ranging from simple monitoring and alerts, to complex, coordinated, multi-agent behaviors such as resource optimization over multiple conflicting objectives, or recommendations for course of action in a dynamic environment. These tailored functions govern and/or stipulate the functional module development environment of the inventive system. FIG. 8 illustrates an exemplary functional agent working in a representative design environment.

As stated earlier, the product line of the inventive system also optionally and advantageously provides application-incorporated functions. The application functions in a preferred embodiment of the present invention include one or more of:
(1) Functional (client) agent and managerial (server/facilitator/monitor/controller) agent interface/interaction/communication in the registry and in the combination of centralized and/or distribution control and coordination.
(2) Building new agent, joining a new agent to an existing agent community, retiring obsolete agents from a community in terms of agent creation/registration/training/organization, and/or in the utilization of agent modules library.
(3) Building new function, joining (plug-in) new functions to existing functional modules, retiring obsolete functions from a module in terms of function creation/modification module, and/or in the utilization of function module library.
(4) Assuring software security and product safety in Agent communication/network environment, data and knowledge security in both transmission and repository phases by ways of applying agent communication module, embedded security, and/or access control.

The present invention comprises a number of optional features including a lattice approach as described herein for constructing agent-based systems, tiered multi-level user domain specialization of threaded product lines, software functionality for agent-based application development, management of resources and libraries within the suite, bridging and mapping to legacy systems, a multi-agent and user-agent cooperative environment, and/or a secure, trusted application environment. These optional features of the invention are more fully described below with reference to relevant figures and examples.

Lattice Approach for Constructing Agent-Based Systems

Turning initially to the lattice approach feature of the present invention, a structural and behavior model of software agent systems is advantageously defined. This feature of the inventive system pertains to a multi-tier, lattice product, structure, and/or approach for the creation of agent based applications, that use a software infrastructure to facilitate generic, optional domain-independent agent functionality and to progressively achieve more domain-specific behavior. The lattice-based hierarchy of software components, along with common protocols, representations and semantics, provide the infrastructure, which advantageously provides the efficient development of a series of related progressively more specialized agent-based applications. The invention also provides the methodology that allows these components to interoperate in the above-identified fashion.

Utilizing at least one embodiment of the present invention, software developers and users with little or no expertise about agent application development should be able to quickly and easily build software agents. Additionally, a variety of users with experience levels ranging from software experts to subject matter experts (SME) are supported by the invention. The inventive system optionally provides an infrastructure for all phases of agent software development—from system analysis through system debug and test. The inventive system provides a graphical programming environment where users can quickly and easily define agents and specify individual agent behavior. An illustration of the graphical environment of the software system development system is as shown in FIG. 2.

The lattice approach for software agent system design and development includes the applications of, for example, a set of standard well-defined software design principles. Such standard principles include object abstractions, information hiding, modular design, encapsulation, divide-and-conquer, separate compilation, packages, version control, functional hierarchy, reuse, intelligent interfaces, and virtual machines. These principles are conventions that collectively lead consistently to dependable and useful software systems. The lattice approach promotes the application and realization of these principles in the software development cycle.

As described earlier, the present invention provides a software product development environment. The lattice feature incorporates software products as individual nodes of, for example, inter-related product tiers. The software products may contain individual modules and/or inherit from other nodes. However, each software product defined as a lattice node can optionally and advantageously be delivered and operated individually as a standalone software package and/or functionality. The word "standalone" here means that each software product defined in the lattice structure of this patent application can be run directly on a designated hardware platform and operating system without assembling and interaction with other software products defined in the lattice structure of this patent application. Each software package contains a set of common functions and a set of specific functions for one or more application domains the package is targeted. For example, a Military AEDGE® package (hereinafter AEDGE) (FIG. 4) contains the functions for military battle field control and comment (C2) and decision aid as well as user interfaces, 2D and 3D visualization, voice synthesizer, and communication agent modules together serving as an Advanced Battle Station and Decision Support System (ABS/DSS). A logistics AEDGE package (FIG. 4) contains the functions for vehicle maintenance data collection and scheduling, user interfaces, visualization, as well as diagnosis assistance and communication agent modules together serving as an expeditionary logistics planning and execution system.

Regardless of whether each software product contains its own software modules or inherits from its parental nodes at the higher levels of the lattice, each specific software product that may be represented as a node in the product line's lattice structure is developed using, for example, a set of functional and product features. These function and features, described in the subsequent sections of this text, include one or more of:

(1) An agent-based software development environment and infrastructure,
(2) A set of generic agent frameworks,
(3) A collection of agent development facilities,
(4) A collection of user interface components, and
(5) A collection of agents and function libraries.

As described earlier, a software product in at least one embodiment is derived from a core-product which is defined as a child of a parent product, as shown in FIG. 3, and may have modules of its own. In a preferred embodiment of the present invention, the core-product in a product lattice is extended in its functional and non-functional properties through multiple branches that define domain-specific ontology, additional agent modules, input/output information flows, functional dependencies, and/or interface functions, specific to a particular application domain. These are called derivative products. For instance, turning to FIG. 3, an exemplary specialization of a product, such as Military AEDGE (104), for one type of application, such as Battlestation AEDGE (106) is illustrated and generally designated.

As illustrated in FIG. 3, there is a core-product namely, Core AEDGE 102 and a number of derivative products. The derivative products include a Military AEDGE 104, a Battlestation AEDGE 106 and an Undersea AEDGE 108. The Military AEDGE 104 extends the Core AEDGE 102 with military domain semantics, such as aircraft, ships, submarines, weapons, targets, tactics etc. Further, Military AEDGE 104 extensions, such as Battlestation AEDGE 106, provide more detailed, specific ontology for those entities in the Battlestation applications, such as aircraft-carrier tactics, alert zones and corresponding agents and so forth. Some nodes of the lattice may inherit specializations from multiple parental nodes of higher-level for example, in FIG. 4, the Supply AEDGE 122 extends Logistics-118 and Shipping-AEDGE 120. A path in the lattice represents a particular product package, for example the path, on FIG. 3, Core-AEDGE 102→Military-AEDGE 104→Battlestation-AEDGE 106 is the complete package for the Battlestation-AEDGE product.

The example on FIG. 3 follows closely the existing hierarchy of components and products in the existing AEDGE® product line of 21st Century Systems, Inc., commercially available and incorporated herein by reference. For example, Core AEDGE 102 represents the existing AEDGE framework for generic agent-based decision support systems, including its domain-independent ontology, the agent interaction and cooperation mechanism and protocols and a number of tools and components to support application development. Further, Military AEDGE 104 utilizes the functionality provided in Core AEDGE and builds on top of it to provide those aspects of the product that have semantics over the military domain, including military entities, military-related agents and so forth. Finally, Battlestation AEDGE 106 is an instance of a specific product that is utilized aboard Navy aircraft carriers for tactical decision support in military missions. Battlestation AEDGE has all of the features and semantics of Military AEDGE, extended with functionality and agents that are derived directly from the duties of commanders and watch officers in aircraft carrier command centers. The additional extension of this process is to now treat Battlestation AEDGE as a platform and a tool set that can be extended even further into a new, more specific product, Undersea AEDGE 108, that now has the characteristics and functionality of Battlestation AEDGE but is more specific in function and semantics as applied to the Undersea Warfare.

As FIG. 3 indicates, the more nodes in the path (the further away from Core-AEDGE) are included in the product, the closer it is to the domain-expert users with little programming experience requirement. Alternatively, the closer it is to the Core-AEDGE, the more the developer will rely on the expertise of the programmer.

The nodes in the hierarchical structure of progressively developed software product specifications are generally interrelated. Each node of the lattice-structure is optionally a standalone software product. That is, the software products represented by the nodes in the lattice structure can be provided to users and performed on a user's computer platform individually, without relying on the interaction with the software product represented on the other nodes of the lattice structure. A user can be provided with a software product on the specific part of the nodes in the lattice structure, according to the user's domain of application and knowledge level of software development. Moreover, the users are optionally provided with the facilities that enable the extension of Ontology, KR, exemplars, and the agent modules that operate over those entities. For example, the users may be provided with a graphics based user interface with text editing facilities for entering, modifying, and updating the domain specific ontology. The users would also be provided with an agent module and functional component library with search and access facilities for in initiating, invoking, and building agents and functional modules to perform specific tasks. The agent modules can be inserted in a working environment the user is currently designing, such as, for example, the Undersea AEDGE (refer to FIG. 3 #108), and be instantiated and connected into the new software system. That is, methods are provided in the inventive system's software embodiment for these kind of functionalities and operations, and are formally specified in the development environment of the software product for the software's adaptation at the specific node levels. The users see the agent modules for carrying these facilities performing the needed functions, as well as getting help (e.g., in directed help texts) in performing these functions. Of course, users can optionally request multiple products represented by the nodes spanning several levels of the lattice structure, to satisfy their needs for broader ranges of software functionalities and specification levels. The core of these functionalities is further described below in more detail.

Tiered Multi-Level User Domain Specialization of Threaded Product Lines

The tiered approach allows users to re-use previously defined domain models and agents, thus reducing the production time of extensions. Another optional feature of the inventive system pertains to a method of extending lattice nodes of the software product with domain specific information, ontology, representations, behaviors and user interfaces.

At least one optional benefit of the inventive system is its flexibly constructed single and multiple folded threads (inheritances) of the software products with respect to different domains, sophistication of knowledge representation, and orientations to different user groups. The multi-facet software products are harmonically woven in the hierarchical levels of the lattice organization. Though we use the word lattice, it is meant in a much broader sense than its original definition in mathematics. The original meaning of the word "lattice" in mathematics is rather restricted. It defines some mathematical structures that are required to satisfy certain relational rules defined in classic set theory for the nodes at different layers of the lattices. Our use of "lattice" is not restricted by the original "narrow" definition of it in mathematics. Our definition of "lattice", for example, in at least one embodiment, is based on the multi-faceted software products of the inventive system that are abstracted as linked nodes in a layered graph/structure where, for example, each node can be clearly identified as belonging to certain layer of the graph/structure. A product node has connections with the product nodes, for example, at the immediately upper layer (named parent nodes) of the graph structure, which we now call a lattice. But, in at least one embodiment, the product nodes generally do not have connections with the product nodes at the same layer. Conversely, a product node at a lower layer of the lattice is called a child node with respect to the product node at the higher layer of the lattice. A child product node is also called a product derivation or derivative product, and possesses an inheritance relation with its connected upper level nodes, the parents.

An exemplary illustration 110 of inheritance and propagation of features in an embodiment of the present invention is shown in FIG. 4. The exemplary system and product is designated as AEDGE®. It should be understood that the use and reference to this product name or description of the product is merely for illustrative purposes and is in no way intended to limit the scope of the present invention or its features to any particular implementation or version of the system and product.

As shown in FIG. 4, there is a Core AEDGE product (112), which serves as the root of the multi-tier product line (expressed in one embodiment in a lattice structure of FIG. 4). The Core AEDGE contains and provides basic agent modules, functions, agent and other characteristics that are described throughout this document. Subsequent products such as, Military AEDGE (114) and Transport AEDGE (116) inherit core functions from the core AEDGE (112) that are relevant to their particular application domains. Examples of such core functionality include the semantically accessible agent modules library and user interface functions library, the agent interaction and communication management modules, agent service-request and service-response modules, system security and quality of service assurance modules, etc. Each of these modules perform system-level (or core) functions needed by the software developers and users. These core functions can also optionally be defined by users on event-based interactions; semantic topic subscription for events; exemplar-based representation of semantic information; uncertainty and belief representation through belief statements and operators; and goal/desire driven execution of agents, using the function extension facility provided in the Core AEDGE and its derivatives. A further optional application may also be derived from Military AEDGE (114). Such an application that would benefit form some of the functions available within Military AEDGE (114) is Logistic AEDGE (118). Because Logistic AEDGE (118) is a child of the Military AEDGE (114), it is able to inherit military and core functions respectively from both Military AEDGE (114) and Core AEDGE (112).

In the other leg of the lattice, a shipping application namely Shipping AEDGE (120), which would have some transportation aspects and functions is derived form Transport AEDGE (116). Shipping AEDGE (120) thus inherits both core and transport functions.

Logistics and shipping both play a role in the supply of items in this example. Accordingly, a Supply AEDGE product (122) can be derived from using the agent function modules in Logistics AEDGE (118) and Shipping AEDGE (120), plus some additional function modules that meet the specific needs of the Supply AEDGE users. As shown in the illustration (110), the inheritance scheme of the present invention implements both lineal and non-lineal inheritance. Specifically, Supply AEDGE (122) inherits core, military, logistics, transport and shipping function from sibling products in the lattice.

The inventive system presents a compelling and coherent system and method for software agent system design. The inventive system, in at least one embodiment, exercises a software environment paradigm that places concrete software components (intelligent agents) and abstraction of software configuration in a generally uniform or systematic agent construction environment as described herein. Users with different aggregations of domain specific knowledge and software development skills can use the inventive system's functionality, features, and facilities at different levels to develop their tailored software product. For example, a typical user will be able to select and apply a substantial subset of functionality provided by the inventive system in accordance with the user's general software development skill. The development skill is incorporated with the user's domain specific knowledge, to achieve a knowledge intensive system design and software product developed to meet their application needs.

It should be understood that the lattice structure of the present invention provides to some extent, for example, a distinct separation of product architecture and core functions from domain specific process and performance requirements. Users can interact with the development environment at different levels or entry points, each of which facilitates one or more functionality.

FIG. 5 gives an exemplary illustration of how users can choose to use the functionalities of the multi-tier product line at different entry points.

FIG. 5 illustrates an exemplary functional structure for tiered usage by users. A number of functions that available to users are shown and described in the context of user tiers. As shown, a 'tier 1' user has the option 202 to extend system ontology with domain specific constructs and definitions. [pvp-020]

A 'tier 2' user has an option 204 to extend the knowledge base of the system with domain-specific terms, through constructs and extensions. Also available to this user is an option 206 to define transformations of ontology and knowledge bases between domains, thus enabling information exchange among different agents and resources.

A 'tier 3' user has an option 208 to utilize existing agents to perform well-defined tasks that are pertinent to the definition of the agent. A further option 210 is also available, in which the user may build domain specific agents by either combining existing agents or constructing new agents from scratch. Sequences of easy to understand instructions are provided to the user to guide the process. The newly built agents operate within the defined domain-specific ontology and corresponding Knowledge Representation. An even further option 212 is available to enable the user to equip agents with a variety of functions as defined in function libraries, and to add new functions to those libraries.

A 'tier 4' user has an option 214 through which the built-in user interface of the inventive system may be utilized to present and manipulate data. Further, an option 216 is also available to build new user interfaces through modification and extension of existing User Interface components or through the development of new interfaces that conform to specific export Application Program Interfaces (APIs).

A 'tier 5' user has an option 218 to define, collect, analyze and store performance measures and data collections of pertinent applications. The range of options extends from agent execution performance and efficiency to user and agent team performance. The options also depend on the domain requirements.

In addition to the foregoing, other user selective functionality are also optionally available to users, including the option to create, test, deploy and maintain end-user-level applications utilizing a subset of the features listed above. Another option allows domain-specific users to setup and modify agent team configurations, agent behavior, KR, Ontology, and other aspects of the software, with the restrictions and assurance of continued service availability and performance.

The inventive system defines a variety of optional user interface components maintained in the product line's user-interface library that can be extended and/or reused to build applications in an efficient manner. User Interface components can be generic as at the Core product level, but be more deliberative at the domain-specific level—at the lower levels of the lattice which represent software products that are developed for specific application domains such as Transport AEDGE (116) or a Logistics AEDGE (118) on FIG. 4. The user interface components could be generic at the Core product level (the Core AEDGE 112) in the sense that only a general working environment of the system, such as a simple dialog box with textual interface, needs to be designed. When arriving at the domain-specific level, such as Transportation AEDGE, more specific interface components, such as the ability to view vehicle deployment maps and diagrams, can be implemented and invoked by the users.

Users of the inventive system's product lines can be classified as Programmers or Subject Matter Experts, or anywhere in between. Programmer users are characterized by their skill in a particular high level programming language (HLL), such as Java or C++. Programmer users use the inventive system as a suite of tools for application development, including agents and software components (e.g. visualization components, agent interaction components, function libraries, avatars, etc. described in the following sections). These tools assist with the system development process by providing interfaces, templates and components, such as user interfaces for agent design, and tools that can be directly used/invoked in the programs such as functions in a function library. SMEs may guide programmers in regards to domain specific knowledge that would be needed to extend the inventive system's components. However, the programmers take the major role in designing and implementing these extensions using the inventive system's software development environment and/or a programming language of their choice.

As used herein, a programmer user is, for example, a person who (a) has knowledge of high-level programming language (e.g., an Object-Oriented Programming Languages), (b) has skill of software development practices, and (c) has ability to interact with APIs and software development tools. A programmer user of the inventive systems utilizes the inventive system's software development environment, for example, for the development of new domain specific applications. The inventive system provides in at least one embodiment a critical facility for programmer users to apply their knowledge of high-level programming language, programming and software engineering skill to develop applications. A programmer may utilize the inventive system, its development environment, and its software components in, for example, two ways. First, as an application baseline having reusable components, standardized interfaces, agents and agent behaviors, libraries with APIs, and so on. Second, as a development environment supporting object-oriented programming and Agent-based programming, including an agent development language, tools (e.g., agent and function libraries), and interfaces (e.g., agent-user and agent-agent message-passing interaction modules). The programmers' understanding of object oriented technology and software engineering will help them understand how and why the inventive system works and how it can be extended through creating additional tiers and applications. Programmer users benefit from the range of tools provided by the inventive system, such as automatic agent-based stub generation, automated component code generation, testing and certification generation.

An illustration of development environment for the programmers interaction with the system is as shown in FIG. 9.

As used herein also, a SME user is, for example, a person who (a) has knowledge of a particular application domain, (b) has the skill of problem solving strategies and methods for that domain, and (c) has the ability to interact with UIs and agent development tools. SME users are not programmers per se. They are experts or generally familiar in a particular domain of human knowledge, and they wish to apply their expertise into the development of an agent system application. Advantageously, SME users need not use a programming language besides the inventive system's development environment. SME users may utilize their knowledge of domain-specific information, data formats, KR, Ontology, interfaces to legacy systems etc. to extend the agent components and create domain-specific constructs as part of a software system application. As already presented in this document, the construct is configured as a lattice where each software product for the specific domain of application is represented by the nodes in the lattice structure. For SME users, the software products they would choose are better presented at the lower levels of the lattice structure, which is constructed with functions closer to the knowledge possessed by the SMEs. Both the programmers and SME can expand more on the cooperative nature of agents, avatars and users, in the context of system development, and later in the use of a deployed agent system. For example, the Core AEDGE itself serves basically as a collaborative (and possibly distributed) environment for application development. The domain-specific AEDGE products extent the basic functions of the Core AEDGE to applications where the software components become more naturally collaborative and distributed through the use of agents. The very nature of the AEDGE agents (and avatars) provides that capability. A SME or a SME team may use some or all of the inventive system's interfaces (visual, voice, others, as required) and may create and manipulate Agents. An SME may also compose new interfaces based on existing components, and modify data representation schemas to fit the selected functions.

While SME users may not be proficient in programming using a high-level programming language, in at least one embodiment of the invention, they are still able to create agent-based applications using the inventive system's development environment, which consists of tools and facilities, as described in the later sections of this application, for the SME users to utilize. For example, starting with defining domain-specific ontology and knowledge representations, an SME can create agents, assign behaviors to those agents and construct multi-agent systems using the agent creation interface. An SME can utilize the inventive system as a dynamic development environment, using existing components and tools for automated creation of domain-specific software system extensions. The SME need only know how to combine pre-existing components or to express rules, relations and dependencies in the domain ontology and knowledge representation.

In some cases Programmer users and SME users are arranged to work together, complementing their specific skills. For example an SME may direct a Programmer to use a particular domain-specific information source, to apply specific functions and to use some established rules in their domain, for creating an agent system application. Thus, the inventive system's software development environment provides for the seamless cooperation and coordination between various software users. For example, a programmer user can work together with a SME, to make use of the SME's knowledge for optimizing his/her agent module design and specifying the agent interaction relations under the directions of SMEs. A SME user can go in to the software development process after a programmer made an initial design and development, to instruct the programmer for further design/extend and optimize the agent system functions.

The following table summarizes the exemplary knowledge, skills and interactions for the two basic types of users, and should not be construed to be limiting. A flexible, multi-tiered product approach of the inventive system best addresses the range of needs of these users.

TABLE 1

Inventive System's Software Development Users and Interactions

| User | User Skills | User-System Interaction | Dependency |
|---|---|---|---|
| Programmer | Programming in a high level language, Using APIs, ADLs, and development tools | Use tool suite, language compilers, interfaces; build code for components and interfaces; build new functions, link into an agent system application | May need an SME to hint on domain-specific semantics and constraints |
| SME | Domain-specific knowledge; knowledge of development environment | Build ontology, agents, interfaces; modify a "live" application; Apply existing functions in new ways | May need a programmer to code bridges to domain-specific data |
| Team | Combination of the above | Interact among each and with other teams, share application codes, develop concurrently | May depend on other teams |

Software Suite for Agent-Based Application Development

A further optional feature of the inventive system pertains to an integrated set of software tools, algorithms, protocols, and component libraries for the creation, management, modification and extension of software agents. This suite of tools shares the common lattice infrastructure described earlier (FIGS. 3 and 4). The software suite features a modular structure in which components, such as Agents, visual interfaces, etc. can be assembled, integrated and verified through tools, in various combinations to achieve a level of integration that is necessary for the efficient development of agent-based software systems. For example, one system of the application under development may choose to integrate the message-passing and massive storage components of the suite to form an agent-based information collection and distribution center, while another system of application may choose to integrate the message-passing component with a set of learning and inference components to form a data fusion and pattern recognition engine.

Five quality measurements of the software systems resulting from the toolkit are taken as design guidance to the software suite and as the principle behind the methodology developed in this invention. The measurements are:

(1) Performance, which includes ease and versatility of use, qualitative and quantitative software code throughput, efficient software execution and response time, elimination of system bottlenecks, and high capacity of task planning.

(2) Reliability, which ensures correct execution of system functions, high levels of component integrity, and built-in checkpoints to ensure system trust.

(3) Simplicity, which is achieved by providing various levels of abstraction and structures that overcome the apparent complexity of the applications, such as the human-computer interface, the system structure visualization, the system components interactions, etc.

(4) Evolvability, which makes the development suite and the resulting application software systems adaptable to changes in functions, environments, and operation scales.

(5) Security, which provides access control, integrity, privacy, authentication, assurance and safety at user-selectable levels.

In the inventive system, changes between agent variants can usually be isolated from specific applications. That is, agents can be built on the basis of a set of common agent structures but with different functionalities to certain functional areas. For example, an agent can be configured to act like an activity planner or a problem solver according to the functions that the agent module calls (those functions reside externally to the agent but can be invoked by the agent), or are embodied in the agent itself (the functions built into the agent, such as scripts or inline functions). The replaceable modular components can provide an almost plug and play mode. While the inventive system includes a large set of working agent components in a semantically searchable agent library, these components also serve as examples of how to use the agent to build the applications, rather than being the framework itself. The software suites provide services to support the construction of user-defined agents, the functional execution of agents, the communication among agents, and the management of user interfaces. These supporting services are also designed as agent modules and components provided as parts of the software product.

The inventive system's product line subscribes to the modular design principle for software systems and to the component based design concepts for the functional development. That is, at the concrete level inside each node of the product line's lattice structure, the product is optionally and advantageously developed to consist of a number of software modules and functional components. The principle and concept of the system adhere to the definition of modules as software units that have a coherent internal structure or relation and are encapsulated. Examples of such modules include a user-interface module, an agent management module, an agent communication module, and agent service module, etc. Definition of functional components means program units (e.g., classes), functional templates, and/or function definitions that in collection form software/agent modules.

Two exemplary types of modules and functional components are identifiable in the inventive system. Additional and/or combination modules may also be constructed and/or used. The exemplary modules are (1) Software modules, and (2) Agent modules. A software module may contain one or more functional components that can be used by the agents or other functional components in the product line through well-defined exported interfaces that are semantically annotated according to an Agent Definition Language (ADL), as described in next section of this text. An agent module may contain one or more functionally different agents and their function definitions, which also described and annotated using the ADL, as described in later sections of this text.

Resource and Library Management within the Tool Suite

Another optional feature of the presented invention pertains to the capability of locating, selecting and utilizing through semantic searches tools the development resources, libraries, and repositories for software components that are needed for the construction of agents. An exemplar-based software library structure and access method is developed. Functional and non-functional algorithm interface specifications utilized in the searches are part of the framework that allows system developers to manage computational resources through automation. A semantic search is a process that parses a request expressed in a natural language statement (with some restrictions on what words, phrases, and numbers that can be used, and how they can be combined and connected.), and extracts the implied meaning so that it is usable by the program (such as a sequence of operations needed to perform the task).

The optional library management and accessing approaches of the present invention are different from the other conventional software library approaches that can also be used in the present invention, and are unique in the way that the library is organized in an exemplar representation schema.

That is, a pertinent optional feature of the inventive system is the incorporation of an exemplar-based representation applied to the storing, organization, and access of library components. For example, conventional software libraries require a user to explicitly specify the names and associated parameters of library component in exact order and spelling, in order to access and make use of the library components (contents). Within the inventive system it is possible for a user to access and retrieve software components he/she needs from a library by simply specifying the general or specific functionality (e.g., specific agent module or entity), thus achieve (implement) a "content-based" intelligent library (information) access mechanism.

There are generally two main approaches to designing an agent communication language, although additional approaches are possible as well as combinations of the two general approaches. The first approach is procedural, where communication is based on executable content. This could be accomplished using programming languages such as Java or Tcl. The second approach is declarative, where communication is based on declarative statements, such as definitions, assumptions, and the like. Because of the limitations on procedural approaches (e.g., executable content is difficult to control, coordinate, and merge), declarative languages have been preferred for the design of agent communication languages. Most declarative language implementations are based on illocutionary acts, such as requesting or commanding; such actions are commonly called performatives. One of the more popular declarative agent languages is KQML.

In a preferred embodiment of the inventive system, an agent communication language—Agent Definition Language (ADL) needs to be constructed. An ADL is a language construct, defined as the union of a vocabulary (a set of primitives, such as words, defining basic functions) and a grammar (a set of rules), specifying how the primitives can be connected or combined to form meaningful sentences (or operation sequences). These so formed sentences or operation sequences are then used for describing and stipulating the interactions between agents, such as how messages (data) are transmitted, and exchanged between agents, how one agent can be called to perform an action by another agent, how tasks can be passed from one agent to others, etc. A user can choose to combine or coordinate multiple existing agents or to create new agents by using the language. For example, the user can define a sequence of agents and their interactions through messages and declare this sequence to be a new agent, through the use of the ADL. The definition of an ADL allows for all standard types of communication, synchronization, execution and management of software agents. Using ADL, users can build agent systems that exhibit complex behaviors. Agent systems may be built by using a collection of relatively simple agents, or from scratch. Within a preferred embodiment, users can implement agents with sophisticated intellectual capabilities such as, the ability to reason, learn, or plan. In addition, intelligent software agents can utilize extensive amounts of knowledge about their problem domain. This means that the underlying agent architecture of this invention supports sophisticated reasoning, learning, planning, and knowledge representation. The philosophy of using a well-defined Agent Definition Language is also to facilitate multi-agent management and interactions.

The exemplar-based semantic search approach of the present invention supports multi-user, interactive operations between the agent system builder and the library. It also supports multicast and directed communication among agents and among the interactions between agents and users.

Bridging and Mapping to Existing (Legacy) Systems

An even further optional feature of the inventive system is a method for the integration of traditional paradigms of agent-based and object-oriented software development and computing. The integration provides a mapping of agent control mechanisms and object structures to a semantic message paradigm wherein, the semantic messages formulate shared knowledge spaces and actions to be taken by the participants in a computation or an agent assembly. The traditional paradigms generated what is termed herein as legacy systems.

The tiered structure of the inventive system provides an ideal mechanism for integrating legacy systems with new agent components built by the users in a more current system. Here the phrase "new agent components" refers to the functionalities implemented through software agents that provide additional and/or new capabilities to the legacy system, or modifies some of the functionalities of the legacy system, which were not previously developed as software agents. The "new agent components" are used to increase the interoperability among legacy systems, to improve their performance, or enhance the capabilities of legacy systems by bringing new functionality or bringing new technology to the existing functionality. Agents designed with the inventive product lines can be used to perform data translation from the legacy systems and implement data system interfaces that meet a wide variety of requirements. When legacy codes that perform some unique functions are needed in the new applications, software agents of the inventive system can be used to create stubs and wraps to invoke and execute the legacy codes, leveraging the value of the existing code base.

The software agents of the inventive system provide the appropriate support to enable execution of both native software and legacy code. In doing this, the inventive system supports KQML (Knowledge Query and Manipulation Language, which was conceived both as a message format and a message handling protocol to support run-time knowledge sharing among agents) or other agent system performatives. It also performs certain functional analysis of multi agent system coherency and consistency. Agent module of the development environment, as schematically shown in the screen layout of FIG. 9, serves as an introduction and explanation for how support is provide for execution of codes. Behind those users selectable icons and pull-down manus are specific software wrappers and stub functions that are invoked by users by pick the corresponding items using computer-equipped interactive input devices, such as mouse or keyboards.

Multi-Agents and User-Agents Cooperation Environment Design

The agents of the inventive system cooperatively engage other agents, users and the operating environment. Specifically, the inventive system provides user-modifiable, application incorporated functions for a variety of agent interactions. Agent interactions include one or more of:

(1) Agent and human interface/interaction/communication in text, voice, imagery, and natural language forms.
(2) Agent and agent interface/interaction/communication in terms of protocols and application development languages, as well as the Agent Definition Language (ADL).
(3) Agent and data/knowledge base interface/interaction/communication in order to access control, access model, access protocol, data format conversion, transmission and repository management.
(4) Agent and event (action) interface/trigger/interaction/processing in terms of event managing/processing using a request-service-response protocol.

Agents and Users

The inventive system provides additional and/or optional software modules and functional components for agent and human interface/interaction/communication. Users in the product line are treated as an integral part of the multi-agent cooperation environment. A schematic exemplary illustration of Agent-User Interactions in an exemplary product line or module AEDGE 301 is shown in FIG. 6

As shown, a product line or module 301, comprises one or more objects 316, agents 308a, 308b, 308c collectively referenced as agents 308, and avatars 306. Interaction between the product line 301 and external mediums or information sources are provided through bridges 312a, 312b and User Interfaces (UI) 304. One or more users 302 a, 302b, and 302c, collectively referenced as users 302, interact with the one or more objects 316 of the product line 301 through the avatars 306 and UI 304. The product line 301 through its agents 308, communicates with a database 310 and data 314, via the respective bridges 312a and 312b. The bridges 312a and 312b provide a link between their respective external or legacy systems and the agents 308b and 308c respectively. As illustrated and as previously described, agents may interact with one another, with objects 316 or with the avatars 306.

The inventive system provides means for agent 308 and user 302 interactions through typical human-computer interface (HCI) in the form of text, voice, imagery, and natural language that can be tailored dynamically to the user preferences in a specific domain application through the user and interface-agent interactions. In a preferred embodiment, three variations of agent 308 and user 302 interactions are provided.

First, agents 308 may interact through coordinator agents 308a. Coordinator agents 308a are special kind of agents 308 defined to coordinate and control agents' responses to users' requests/instructions. This is the normal channel of agent-user interaction. Second, agents 308 may interact directly with users. Certain functional agents are designed to interact directly with users by receiving requests/instructions from users and sending responses back to users through designated channels. Third, agents 308 may interact through Avatars 306. In this third case, an Avatar 306 serves as an abstract representative for a user in a KIS. Specially designated user interfaces 304 are used for the means through which a human user 302 interacts with its avatar 306 (and thus with the rest of the software product).

Having provided an overview of the interaction/communication among components of the present invention, i.e. objects, agents, avatars, users, etc. A more detailed discussion of the interactions follows.

Users and Avatars

One of the optional interactions that occur within the present invention is between users and avatars. Avatars in the software product of the inventive system can optionally represent users. An avatar is a special type of software agent that can be created, instantiated, and activated to represent a specific user, set of users and/or different users. Avatar definitions and base types are contained, for example, in the Core software product, while domain-specific extensions can be added into derivative software packages of the product line. Avatars are able to interact with agents and with other avatars. An illustrative example of Avatar representation is shown in FIG. 10, where human like icons or, sometimes directly as the functionality provides, human photos are used as display of the Avatars on the software development environment display. There are base types of Avatars for agent management and registration, Avatars for communication coordination, Avatars for module and component library management, etc.

An avatar may execute actions either directly triggered by the user and/or scheduled by the user in advance. Avatars do not have autonomy in the same sense that agents do, rather, avatars can be operational (e.g. logged in, listening and displaying) while the user is away from the console. Users have full control (within the security restrictions of the software product) over their avatar(s). Every user has a Primary Avatar, which embodies the identity of the user inside the product line. A user can choose to create or destroy any number of additional avatars, but in at least one embodiment the user's Primary Avatar, for example, cannot be destroyed by the ordinary user directly; super users allocate and manage primary avatars. Users may interact with their avatars, for example, through user interfaces—graphical, visual, speech, sound, mechanical devices etc. Thus a hierarchy of user control and security management is enforced in one embodiment of the inventive system. The user interface components connect the physical interaction with the human user with the logical interaction with the user's avatar. Alternative interactions between the user and the avatar may also be used.

FIG. 11 provides a schematic illustration of Avatar interactions in a development environment. There are number of Avatar interaction types that can be built in the multi-tiers of the software production line, for example, (1) conference room type interaction, (2) group discussion type interaction, (3) workshop type interactions, and/or (4) person-to-person private line interactions, as illustrated in FIG. 12.

In one embodiment, avatars interact with most agents of the product line through the same event-based interface as agents and objects do. The avatars recognize event semantics within the current semantic ontology of the software application or environment. The avatars also abide by the same security rules, resource utilization restrictions, and quality of service guarantees as other agents do. The inventive system ensures, in at least one embodiment, that avatars can always take priority over agents, in essence preventing "runaway agents". In another embodiment, certain agents may apply semantic belief designations to discount events from certain avatars (e.g. don't need to know, or ignore).

The product line, i.e., the multi-tier software, of the inventive system permits a user-to-user interaction through the users' avatars. This is again enabled via the event management system. Avatars at both ends of the interaction are able to "decide" the best ways to interpret the received events. Security and performance policies may apply as with other agent and user interactions.

Agent and Agent Interactions

Another alternative and/or optional interaction within the present invention is between agents, such as the illustrated agent 308a and agent 308b of FIG. 6. The product line of the inventive system provides software modules and functional components for optional agent to agent interface/interaction/communication through properly defined/adopted protocols and languages. The interactions can be generally created in autonomous mode, brokered, and/or request and/or response modes.

Agents in optional autonomous interaction mode respond to call-for-action (CFA) in terms of their individual perception of the situation while taking into considerations their own functional requirements (desires) and the nature of the CFA. In alternative wording, the agent volunteers its service in response to CFA that could be triggered by an event, by an agent, or by a user.

In optional brokered mode, the communication and cooperation between agents are brokered, monitored, mediated and/or supervised by one or more agent coordinators. Agent coordinators are responsible for matching requests, from CFAs to agents based on descriptions of the capabilities of the agents in a registry. The coordinators are also responsible for delegating complex goals, triggers, and data management requests; agent-based provision of multimode user interfaces; and built-in support for including the user as a privileged member of the agent community. The brokered mode can operate in synchronous or asynchronous mode, in closed loop (feedback) or open loop (no feedback) mode.

In the optional request and response mode of agent interaction, an agent A, having knowledge of the functionality of an agent B, could issue a request of service directly to agent B. Agent B could then respond to the request of agent A, performs the requested task, and sends result/response back to A.

The specifications of these agent interaction modes are optionally contained, for example, in the Agent Definition Language (ADL) and executed in the ADL implementation—the software agent modules and functional components that perform the reading, parsing, and interpretation of the language constructs (words, phrases, and statements that describe the agent interactions). In the ADL, as in the inventive system's definition, agent to agent interactions are handled as operational events in general where an event has a lifecycle of ["Trigger"→"Transmission"→"Response"→"Execution"→"Feedback/Reporting"]. Using the Agent Definition Language of the inventive system, the users can choose to combine or coordinate multiple existing agents or to create new agents in the application software product. The ADL allows for all standard types of communication, synchronization, execution and management of software agents.

The executions of events are regulated, for example, by the semantic specifications of the events and the knowledge representation associated with the attributes of the events. A semantic metric is often attached to an event to describe the level of certainty and other specific attributes of the events. This metric also stipulates how an event is executed and by which agent the event should be executed.

For example, in the autonomous mode, the event to be executed will be posed on a common information exchange area called a blackboard. Every agent in the system has access to this blackboard for posting messages, viewing messages, and possibly responding to a message. Once a message representing an event is posted, the agents that have the ability to execute the event could respond to the event, in terms of the semantic attributes and metrics attached to the event, and/or the knowledge representations pre-determined in these agents. A synchronized or non-synchronized negotiation takes place among the agents in case multiple agents can respond to the same event. An alternative approach that applies a semaphore technique may also and/or alternatively be implemented in such a way that the first agent that takes the responsibility of executing the event sets a flag on the event posting in the blackboard so as to prevent other agents from duplicated picking up and responding to that event.

In the event that the agent is unable to fulfill the task, the agent is, for example, able to reset the flag, so that other agents may then respond to the event. As soon as an event is successfully executed, the executing agent will also reset the flag, meanwhile removing the event from the blackboard and marking the termination of the event's lifecycle. The removal may be done by an event monitoring/management agent specially designated in the software system. The executing agent also sends a feedback or a report to the event-initiating agent to indicate the successful execution of the event.

Agent and Data/Knowledge Interactions

Yet another optional interaction in the present invention involves agents and data or knowledge repositories such as, database 310 and data 314 of FIG. 6 The product line of inventive system provides software modules and functional components for agent and data and knowledge base interface, interaction, and communication. Both the data and knowledge, and information in other instances, are referred to as objects in this document. Functional modules for access control, access model, access protocol, data format conversion, and real time management are defined on the stream and repository of the objects in the software product. These functional modules are defined on the basis of a properly defined ontology of the objects in relation to the inventive system's lattice level/node or in the problem domain.

Object Ontology Hierarchy

Ontology in the core product and optional derivative products of the inventive system form an ontology hierarchy. Each derivative product can have its own ontology set. The ontology at the core product level can be shared by other derivative product levels. That is, the ontology of the core product is a common subset of the ontology of the derivative products. This leads to an open-ended hierarchical object model.

FIG. 13 shows an illustration of an Ontology layer structure in a lattice, where the layers can be in correspondence to the layers of product line, or domain specifications.

The core product of the inventive system defines, in at least one embodiment, generic object ontology with properties and functions that serve as a base for any domain-specific knowledge representation extensions. The Object Ontology described herein provides the base functionality to create, manage, link, and explore objects and their relations. A user is able to attach semantics and extend functions by defining new object properties and relations.

The Generic Object Ontology is advantageously and optionally specialized and extended with domain-specific attributes in the derivative products, the software generated as a child production (e.g., Military AEDGE) of a software (e.g., the Core AEDGE) in the multi-tier product line. Application domain knowledge is captured in and/or characterized by ontology that inherits properties from the Generic Object Ontology and is extended with domain-specific information and semantics. A user is able to extend (by addition or redefinition) an existing ontology into more domain-specific ontology. Such specialization can occur either at design time or at run-time, and require knowledge representation (KR) transformation functions to be defined, so that the agents operating with the new, specialized KR, can inter-operate with other (older, more generic) agents. The objects in a KR are represented in various semantic aspects complying with the domain ontology. There are agents in agent modules of derivative products that operate with the domain specific ontology defined for the application.

Agents and the Environment

Agents in the software products can, in some cases, interact with the external environment of the deployed space. This is achieved through special optional gateway agents (bridges) that translate application-external data flows to application-internal ontology representations. Bridges thus in essence provide ontological translation from an external ontology to an internal ontology. Gateway agents in most cases will require domain-specific knowledge (such as the mapping of external to internal ontology) to be developed. The gateway mechanism, though, are provided in the Core product and instantiated in Derivative products.

Agent and Event Interactions

A further optional interaction in the present invention pertains to agents and events. The product line of inventive system provides software modules and functional components for agent and event interface, trigger, and interaction.

Agent activation in an application is basically "Event Driven." Events are manifested, triggered and arisen through the executions of message passing, direct call or interactions, and volunteer actions.

In message passing, events are manifested by messages, which are, for example, special or dedicated objects that encode information (state) and are capable of propagating the information from a source agent or object to one or more destination agents/objects. In direct call/interaction, events arise from agent or object designator A to agent or object designator B. In the volunteering situation i.e. autonomous action of agents, events are posted on the blackboard.

The functionality/product line of inventive system provides functions to (invoke agents if necessary) respond and execute requests raised by the operational environment. Event processes may be implemented in (1) Threaded, and/or (2) Non-threaded modes. Agents and objects interact with each other through events. The interaction is triggered, for example, by one agent or an object generating and sending an event and another agent or object receiving that event.

Events can be created, sent, received or manipulated (including re-routed) by agents and users of the software environment. Events can be optionally uniquely addressed—each event can have a unique identifier and a timestamp of creation. No two events ever have the same ID and timestamp. Events are also transferable, e.g., an event can be transferred from one state to other through actions of agents. An event can optionally have a sequence of states, from creating to transferring or publishing, to execution and resolving. An event can also optionally have a unique semantic type associated with it. However, there could be multiple events with the same semantic type. A set of event semantics can be defined in the core product and in derivative products, respectively, for generic and domain specific event type identifications. In essence a given set of event types with their semantics represents a static interface contract. Note, however, that an agent is free to vary its responses to an event with fixed semantics according to other parameters and event sequences.

Having described the various optional agent and event interaction along with the various source and characteristics of events within the invention, focus is now shifted to how those events are handled and processed.

Event Processing

Each agent has the capability to process certain types of events. An event triggering process can be expressed, for example, in CFA mode. Event processing functions are extended as agents and objects are specialized to certain event types. Once an event is received, it is consumed or processed and the destination agent or object triggers its event-processing functions, which result in one or more of the following: a) change of state; b) execution of a method/function; c) generation of new events; d) forwarding of the event to another destination; e) creation of new agents/objects; or f) destruction of existing agents/objects.

The core of the event interaction model lies in an efficient yet sophisticated event distribution mechanism, which can be in either One-to-One (OtO), One-to-Group (OtG), or Group-to-Group (GtG) formats with simple sending-and-receiving, or pre-designed dispatching-and-routing logic. Events are able to reach their specified destinations, even though multiple matches are allowed. This is made possible by the hierarchical organization of the collection of agents and objects, based on the natural need for interaction among each other. Certain members in the agent/object hierarchy act as event coordinators and have knowledge of event usage and needs. It should be understood that such usage and need may be domain specific. As described, events must be passed throughout the system. This function is provided by an Event Transporter component, which may utilize various external communication mechanisms, such as TCP/IP sockets, UDP/IGMP multicasting, CORBA messaging and so forth.

The Event Transporter guarantees or manages certain event propagation properties. The Transporter is responsible for event serialization and for utilizing communication mechanisms from delivering the events. Associated with event transporter is an Event Transport Protocol. An Event Transport Protocol includes the capabilities of restraining fail-over mechanism—the ability to withstand a certain level of service outages without causing a system halt; and is reliable—defined by an established Mean Time Between Failure (MTBF) guarantee. The Event Transport Protocol (ETP) is based on the idea of reliable multicasting with a domain-independent addressing scheme. Agents and objects can use the ETP to send messages not to a particular destination object, but rather to an address, which in turn may represent a single object or a group of agents/object. Similarly, the event source is identified by an address which represents a group, and trivially, a single instance. The ETP provides the following services to the overall environment:

Event serialization. Events, by definition, contain information that is domain-specific and reflects the state of the sender as pertinent to the receiver. Such information may, for example, be represented by complex non-linear data structures. The ETP is responsible for creating linear representations of these data structures to form network messages or internal shared-memory maps of the information.

Object and agent addressing scheme. Each agent or object in the system may, for example, be described by one or multiple addresses, based on the function of that object. While the address itself may be domain-specific, since it characterizes the nature of the agent in its application domain, the addressing scheme provided by the ETP is domain independent. That enables a uniform message delivery inside or across domain boundaries.

A routing mechanism. The ETP's addressing scheme is tightly related to its event routing mechanism. The routing should provide efficient event delivery with, in at least one embodiment, the properties described below. Routing mechanism implementations are replaceable and can be domain-specific, and as such, are implemented by routing agents themselves. However, the ETP provides the domain-independent event routing interface, for which those routing agents are bound to implement.

Further, the ETP services are characterized by one or more of the following optional quality of service (QoS) parameters:

Reliability. ETP delivers messages from their source address to their destination address without loss or unpredictable delay.

Availability. ETP is accessible and available to all components and agents in the system at the level required for maintaining nominal operation.

Fault tolerance. The protocol continues to perform (in a degraded, but predictable fashion) in the presence of transient and permanent faults.

Security and safety. The protocol protects the confidentiality levels of the events by providing guarantees that events will not be misrouted or otherwise exposed. The protocol may employ lower level encryption and security models to achieve that.

Performance. The protocol provides predictive performance measures and enforces the quality of event delivery as measured by: a) end-to-end delay; b) end-to-end throughput. Agents and components can receive a reliable estimate of these parameters before a message is sent.

Since the ETP is implemented in at least one embodiment on top of Operating System (OS) services, the Event Transport Protocol's QoS guarantees can be only as good as those provided by the OS. In order to foster the open and distributed nature of the system, the ETP may alternatively be implemented on non-real-time Operating Systems, which will not have inherent performance and fault-tolerance guarantees. Further, some of the underlying message delivery and network layer protocols (such as TCP/IP) can also introduce unpredictability or faulty behavior. To take this into account, the ETP, implemented on such systems, will still be able to operate under relaxed constraints, but it is required to provide the correct QoS estimates up to the application-level objects and to label events in a manner appropriate for the available QoS.

The agents of the inventive system have thus far been described in relation to their communication and interactions. Another important aspect relating to agent existence and management is agent construction part of the inventive system.

Agent Construction

The product line of the inventive system provides software modules and functional components for building new agents, joining a new agent to an existing agent community, and retiring obsolete agents from a community. A new agent may be created using, for example, the descriptive functions provided in the Agent Definition Language (ADL), via the agent creation tools that can be activated through the user interface. Alternatively, a new agent may be created by combining a group of existing agents while adhering to the rules of the ADL. Another option for creating an agent involves integrating a group of existing (pre-defined) functions, through the rules of the ADL, to form a new agent to perform the combined functions.

The creation of agent in a specific software application is facilitated by making use of pre-defined agent functional components in an Agent library. The pre-defined agent functional components are, in principle, similar to pre-defined functions of the conventional programming languages, that are typically provided in the function libraries together with the compilers or run-time environments for the language, when the compiler is sold or licensed to the users. Agents, agent functional components, and agent families in the product line can be developed, stored persistently, and reused at a later time by the same or another branch of the system's lattice structure, which inherits the same domain ontology. Agents in a library can be retrieved by their functional and non-functional (identification, name) descriptions. When new agents are composed, their consistency and behavior is checked against the rules defined in the ADL, using automated agent verification tools.

Agent Learning

Turning next to agent learning and behavior, agents in the product line of the inventive system are able to optionally modify their behavior (either off or during run-time) to satisfy their objectives more successfully as their perception of the environment (through events) changes. This ability is called "agent learning". Learning is not a required feature for an agent, though in most cases it will cause an agent to be more useful. Learning can be achieved with the help of human user(s)—guided (supervised) learning; or without such intervention, based exclusively on interactions with other agents and the environment—autonomous (unsupervised) learning. In practical terms, learning consists of sensing, evaluation (or cognition), and modification of own behavior. Sensing in this case is the usual reception and processing of events by agents. Evaluation is a complex process, based on past actions and feedback from the environment (and human users). The process results in a quantitative classification of how the various functions of the agent contributed towards its objective. The evaluation is a factor that determines how the agent can modify its functional parameters and procedures in order to cause progressive adjustments in the behavior that are perceived as desired.

Agent learning can be conducted in either supervised manner or unsupervised manner. In a supervised learning, the agent needs to have interactions with a human or an authority (could be a database of facts or rules or other agents) that judges whether the agent is acting correctly. In an unsupervised learning, no human or third party is involved in the learning process. The agent has to determine if its modified (learned) behavior is appropriate, often by observing the new outcomes resulting from the learning, or an evaluation of the performance (improving or worsening) after the learning.

Agent Management

The operation characteristics and persona of the agents is provided, for example, by an agent management component. The product line of inventive system provides software modules and functional components for functional (client) agent and managerial (including server, facilitator, monitor, or coordinator) agent interface, interaction and communication tools for agent management, control, and coordination. The product line provides the following managerial choices for agents at different levels of the lattice and in terms of different functional possessions of the agents:

(1) No controller (autonomous, self-governing agent),
(2) Localized (distributive) coordinator or mediator,
(3) Centralized controller or manager,
(4) A combination or balance of centralized and distribution control and coordination.

All agents, regardless of whether they are activated or temporally in-activated, are optionally and preferably registered in an agent registry. Each software product (Core or Derivative) maintains its own agent registry, though the derivative product can have inheritance to the registry of the Core product. A hierarchical agent/object registry mechanism is available to allow software components to find each other. The agent registry also contains at a minimum, the agent identification, date of creation and activation, activation status, functionality, and other operation-relevant information.

Coordinator agents in the product line carry out the agent activity monitoring, task distribution, agent activation, and other agent management tasks. The coordinator agents are special agents that can be defined in Core product and be inherited by Derivative products.

Yet another agent management aspect is provided by the present invention. As described earlier, the present invention provides software modules and functional components for agent construction. The creation behavior and characteristics of such components are also handled by the agent management modules of the inventive system.

Function Construction and Management

Software modules and functional components enable building of new functions, joining of new functions to existing functional modules, and the retiring of obsolete functions from a module.

The product line of the inventive system contains agent modules for function creation, modification, and/or function library management. In much the same way as for managing agents, a function can be created in a number of ways including specifying the computational procedures of the function from scratch; modifying (enhancing) an existing function; and/or combining a group of existing functional components to form a new function.

Similar to user interface components, the software product of the inventive system also provides and maintains libraries of functions. At the Core product level these libraries contain many useful common-application-oriented computation and analysis methods, such as linear optimization, fast Fourier transforms, Bayesian reasoning, etc. At lower, domain-specific tiers, more specialized functions may be added. The function libraries are available to agents through well-defined interfaces. The agents can select and use these functions based on functional and non-functional descriptions and input/output value definitions, such as the length of string or the number of elements in an array, via the search and retrieval interfaces designed for the libraries in the software product.

Agent Definition Language Example

| ADL - Agent Definition Language - Drill Down Level Example | |
|---|---|
| Entity: | Comments: |
| Agent SentinelNetAgent { | # Specialize |
|   Is AEDGE.ThreatResolutionAgent |   ThreatResolutionAgent |
|   Is AEDGE.ForceProtection |   into SentinelNetAgent by |
|   Is AEDGE.HICIN |   incorporating specific features |
|   Has AEDGE.SpatialAwareness As HCI |   for force protection and User Interactions (UI). |
| | # UI is an event correlator, asserting changes UI state |

Comment:
Each clause is an event interface with pattern matching extending from higher level components and learning capabilities on Message parameters. The bodies of the clauses are expressed as proofs for the events. This example is for demonstrating the multiple levels of detail in agent specification.

| Clauses: | Comments: |
|---|---|
| ForceProtectionPlan( _Plan ) = | # Load the Force Protection Plan into the Fact Space and Proposition Space. |
|   @FactSpace( _Plan.Sources ), | # learning Sources |
|   @PropositionSpace( _Plan.Rules ). | # learning Rules |
| Observation( _HyperCard ) = @HCI( _HyperCard ). | # Observations sent to SentinelNet are in HyperCard format |
| | # Hypercard sources are loaded in the HICIN, and are further classified and reasserted by the HICIN proposition space as Observation |
| | # HCI is UI, asserting changes the UI state |
| | # if no action is known, ask the User and learn the new threat resolution. |
| ~Action( _Threat, _Action) = !HCI( Action( _Threat, Action_ ) ), | #Send Event to HCI to ask for Action resolution |
| @Action( _Threat, _Action ) = _Action is Action_ . | # Learn as new event rule, specialization of Action |
| } | |

Example of High Level ADL Agent Integration

---

ADL - Agent Definition Language - Lower Level Example

---

Entity:
  Agent ThreatResolutionAgent {

Comment:
Each clause is an event interface with pattern matching on Message
  parameters, and the body being a proof for the event.

| Clauses: | Comments: |
|---|---|
| Threat( __Object ) = | |
|   Enemy( __Object ). | |
| Enemy( __Object.ENEMY ) = | # pattern match if Object is |
|   Fact1( __Object ), |   of class ENEMY |
|   Fact2( __Object ). | # 2 conjunctive conditions |
| Resolve( __Object, __Action ) = | # Resolve the action for the |
|   Threat( __Object ), |   threat, if it is one |
|   Action( __Object.ThreatType, | # If no Action known to my |
|   __Action ). |   interface, or any |
| Action( UnderWaterThreat, __Action ) = |   specialized interface, then |
|   __Action is Scuba. |   call ~Action to allow |
| |   learning. |
| Action( WaterThreat, __Action ) = | |
|   __Action is RHIB. | |
| Observation( __HyperCard ) = | |
|   @ownassert( __HyperCard ). | # Agent specific assertion |
| } | |

Example of Lower Level ADL

Secure, Trusted Application Environment

A further optional feature of the present invention pertains to automated and inherent security of execution, data integrity and balanced resource utilization within the tiered structure of the software product represented abstractly in the lattice nodes. These secure software production and trusted applications are achieved through tools, algorithms, protocols, and software components that verify and guarantee security properties on existing and newly designed agent applications developed with the toolkit in the tiered software products of the lattice structure. Automated software development tools, such as UML (Universal Modeling Language, a commercial off-the-shelf (COTS) product for software module design, can be used in conjunction with the generic agent framework to maintain the consistency and security of the application at each level of the software products in the lattice structure of progressive domain specialization.

The inventive system optionally provides secure data sharing, integrity, and agent interaction protocol. Further, it allows multiple agents running in the same environment to be threaded so that they can perform their tasks simultaneously without interfering with each other. For example, an agent assembly consisting of a user interface agent, a database interface agent, a machine tool interface agent, and a process monitoring and control agent in a specific application could run concurrently on the same processor or could be easily distributed across multiple processors without losing security and trustfulness.

It is important that software contain a mechanism that will provide some assurances that the people on the system are who they say they are, and the operations they perform are not malicious in nature. The distributed nature of Agent-based software and extremely precise security requirements for the product line of the inventive system preferably requires a layered model for protocols and network communications. This view is no longer limited by the application layer, but is extended to user and system layers to include methods to deal with content and user interaction among the software products abstracted as the interconnected nodes in the lattice structure.

Security is treated as a crosscutting concern that affects all aspects of the product line represented as the lattice nodes in the inventive system's lattice structure. Various aspects of security functions are addressed by the present invention, including one or more of the following functionalities:

(1) Providing a base line software modules and functional components for assuring data/knowledge and software security and product safety for software products on all lattice nodes.

(2) Embedding data and knowledge security in both transmission and repository phases of the production line.

(3) Processing Software security requests through exception handling in the domain specialization products on the lattice nodes.

(4) Enforcing access control to ensure the product security in the domain specialization products on the lattice nodes.

(5) Building security measures in the Agent communication/network environment over the agent interaction modules on the base line of product series.

As used herein, security assurance is a guaranteed level of permission for objects to perform processing or use services within the agent-based environment. In the product lines of the inventive system, (1) Trusted Agents contain methods necessary to guarantee proper code execution and access permission to resources.

(2) Trusted Data is provided by methods that ensure data integrity and ensure that only authorized objects have access.

(3) Trusted Users are those users that have passed through a series of gates and protocols based on the appropriate levels of security that are required. The varying levels are divided by identification, authentication, and authorization processes monitored by specifically designated agent.

(4) Measurement tools exist to monitor, log and report on the activity of users and agents, and their compliance with security standards. and/or (5) Access to application and user data uses the principal of "Least Privilege." In other words, any object (agent, user, service provider, program, system, etc.) only has the privileges the object needs to perform its assigned tasks and no more.

To ensure data usage and transmission security, the product lines of the inventive system includes optional methods for handling instances of data traversing boundaries of varied classification types while maintaining data integrity. All data and/or messages that traverse this boundary are "tagged" in such a way that validation can be performed through either automated or manual means. Software exceptions in the product line generate security-related exception handling events. As with other aspects of the inventive system, processing of an exception is treated as an event processing. Exception events are assigned a higher priority than normal events and this priority affects how events are routed, delivered and processed.

System Safety is a guaranteed level of protection that the agents optionally provide to the system and themselves. The system safety guarantees of the inventive system include one or more of the following options:

(1) Threat identifications based on both temporal situation and physical location are performed.
(2) Methods for malicious logic detection in terms of destructive network traffic patterns and user behavior trending are provided.
(3) Intrusion prevention methods performed at both transmission protocol resets and data block levels when malicious traffic presents is detected. All devices are provided with safety level awareness designations to allow for monitoring of the safe operations of the system components.

Quality of Service (QoS) is an optional guaranteed level of execution and performance for agents, objects and services running on a system. The product line of the inventive system includes mechanism for providing service levels that address one or more of the following optional QoS related issues:

(1) Application QoS levels are established based upon program execution time, processor utilization, and memory consumption in domain specific software products. QoS standards are enforced by methods that guarantee service level delivery. Such QoS standards are aggregated from lower-level behavioral (Agent or Component) descriptions that are put in place during the normal application design and development and maintained through deployment of the product specialization.
(2) Packet-level controls are put in place to control network bandwidth utilization and application traffic routing priorities on base line product specifications in the lattice structured software hierarchy.
(3) Methods for measurement of the advertised QoS levels and reporting on the delivered value are provided in the agent components of the domain specific software products of the inventive system.

The security and QoS are realized optionally at various agent component levels of the inventive system. However, they are also implemented in distributions of the other non-functional system components, such as the agent definition language, the protocol for agent communication and the protocol of agent interactions including the event triggering, execution and feedback responses. This distributive implementation is also complemented by centralized check and verification mechanisms built in the system. It is possible to have a set of designated software agents designed in the system that are specialized to take charge of the monitoring and coordination of security, assurance, and QoS. These specialized agents, in addition to the agents specifically designed in the system for access control, account management, and other security functions, can be designed in one of two ways.

(1) They can be designed by assignment of the specific task to agents in an event-processing format.
(2) Alternatively, they can be created as special agents by advanced users according to an application software specification.

Both the specifically designated security agent and general functional agents that incorporate security functions, use a common security-related semantic metrics and knowledge representation as defined above to perform and guarantee proper levels of system security, information assurance, and QoS.

The various features, specifications, and implementation details shown and discussed above illustrate the novel features of the development, infrastructure and methodology of the present invention. A user of the present invention may choose any of the above features or an equivalent thereof, depending upon the desired implementation. In this regard, it is recognized that various forms of the subject systems could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

What is claimed is:

1. A system for developing an intelligent agent-based software application in a multi-platform integrated development environment comprising:

a computing system having at least one processor, at least one memory coupled to said processor, and an operating construct stored in said memory operable to execute a set of steps on said processor;

one or more libraries for use in developing said intelligent agent-based software application stored in said computing system, said libraries comprising software components, tools, algorithms and protocols, wherein said libraries are accessible via application programming interfaces, human-computer interactions, security, and data accesses;

at least one generic software component which is oriented to application-independent functionality, which is represented and stored in said memory as a generic root product node of a product lattice network, and which is used in developing said intelligent agent-based software application;

one or more specialized software components which are more specialized and application-specific than said generic software component, which inherit all of the functions and capabilities of said generic software component, which are represented and stored in said memory as one or more child nodes of said generic root product node in said lattice network, wherein at least one of said specialized software components comprises one or more intelligent agents, and wherein said specialized software components are used in developing said intelligent agent-based software application; and one or more further-specialized software components which are progressively and recursively more specialized and application-specific than said specialized software component, which inherit all of the functions and capabilities of said specialized software component, which are represented and stored in said memory as child nodes of at least one or more of said specialized software components and said root product node in said lattice network, and wherein at least one of said further-specialized software components comprises one or more intelligent agents.

2. The system of claim 1, wherein said libraries further comprise one or more predetermined agent templates and one or more software components, wherein said software components are a combination of one or more existing intelligent agents and algorithms, and wherein said system further comprises means for accessing and using said libraries to construct and store one or more new intelligent agents.

3. The system of claim 2, wherein said libraries are identifiable by specific interface descriptions.

4. The system of claim 2, wherein said libraries are accessed and used through human interaction with said libraries.

5. The system of claim 2, wherein said libraries are accessed and used through intelligent agent-based domain-specific criteria evaluation and learning.

6. The system of claim 2 further comprising an agent definition language for constructing said new intelligent agent.

7. The system of claim 6, wherein said agent definition language comprises a semantic-based construct.

8. A method for developing an intelligent agent-based software application in a multi-platform integrated development environment comprising:

storing one or more libraries for use in developing said intelligent agent-based software application in a memory, said libraries comprising software components, tools, algorithms and protocols, wherein said libraries are accessible via application programming interfaces, human-computer interactions, security, and data accesses;

using an interface coupled to said memory to select from said libraries at least one generic software component which is oriented to application-independent functionality, and which is used in developing said intelligent agent-based software application;

using said interface to select from said libraries one or more specialized software components which are more specialized and application-specific than said generic software component, which inherit all of the functions and capabilities of said generic software component, wherein at least one of said specialized software components comprises one or more intelligent agents, and wherein said specialized software components are used in developing said intelligent agent-based software application;

using said interface to select one or more further-specialized software components which are progressively and recursively more specialized and application-specific than said specialized software component, which inherit all of the functions and capabilities of said specialized software component; and storing within said memory said generic software component as a generic root product node of a lattice network and said one or more specialized software components as one or more child nodes of said generic root product node within said lattice network.

9. The method of claim 8, wherein said further-specialized software component is stored within said memory as a child node of the generic root product node within said lattice network.

10. The method of claim 8, wherein said further-specialized software component is stored within said memory as a child node of an existing child node within said lattice network.

11. The method of claim 8, wherein said libraries are identifiable and searchable by specific interface descriptions.

12. The method of claim 8, wherein said interface to said libraries is a human-computer interface.

13. The method of claim 8, wherein said interface to said libraries is via intelligent agent-based domain-specific criteria evaluation and learning.

14. The method of claim 8, wherein said libraries further comprise one or more predetermined agent templates and one or more software components, and wherein said software components are a combination of one or more existing intelligent agents and algorithms, further comprising the steps of:

using said interface coupled to said memory to access said libraries;

developing one or more new intelligent agents based on said predetermined agent templates and software components; and storing said new intelligent agents in said libraries.

15. The method of claim 14, wherein the step of developing one or more new intelligent agents is accomplished by using an agent definition language.

16. The method of claim 15, wherein said agent definition language comprises a semantic-based construct.

17. The method of claim 8, wherein at least one of said intelligent agents interacts with the external environment.

18. The method of claim 8, wherein at least one of said intelligent agents is activated upon the occurrence of a predetermined event.

19. The method of claim 18, wherein at least one of said intelligent agents is able to modify its behavior based on the occurrence of one or more events.

\* \* \* \* \*